United States Patent
He et al.

(10) Patent No.: US 11,823,322 B2
(45) Date of Patent: Nov. 21, 2023

(54) UTILIZING VOXEL FEATURE TRANSFORMATIONS FOR VIEW SYNTHESIS

(71) Applicant: Adobe Inc., San Jose, CA (US)

(72) Inventors: Tong He, Los Angeles, CA (US); John Collomosse, Woking (GB); Hailin Jin, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/807,337

(22) Filed: Jun. 16, 2022

(65) Prior Publication Data

US 2022/0327767 A1 Oct. 13, 2022

Related U.S. Application Data

(62) Division of application No. 16/838,429, filed on Apr. 2, 2020, now Pat. No. 11,393,158.

(51) Int. Cl.
*G06T 15/08* (2011.01)
*G06T 7/73* (2017.01)
(Continued)

(52) U.S. Cl.
CPC ............ *G06T 15/08* (2013.01); *G06T 7/74* (2017.01); *G06V 10/454* (2022.01); *G06V 10/82* (2022.01);
(Continued)

(58) Field of Classification Search
None
See application file for complete search history.

(56) References Cited

U.S. PATENT DOCUMENTS

| 7,924,279 B2 * | 4/2011 | Gerritsen | G06T 15/08 345/424 |
| 2018/0144447 A1 * | 5/2018 | Tate | G06T 5/003 |

(Continued)

OTHER PUBLICATIONS

Anderson, B.D., Moore, J.B., Hawkes, R.: Model approximations via prediction error identification. Automatica 14(6), 615-622 (1978).
(Continued)

*Primary Examiner* — Yanna Wu
(74) *Attorney, Agent, or Firm* — Keller Preece PLLC

(57) ABSTRACT

Systems, methods, and non-transitory computer-readable media are disclosed for utilizing an encoder-decoder architecture to learn a volumetric 3D representation of an object using digital images of the object from multiple viewpoints to render novel views of the object. For instance, the disclosed systems can utilize patch-based image feature extraction to extract lifted feature representations from images corresponding to different viewpoints of an object. Furthermore, the disclosed systems can model view-dependent transformed feature representations using learned transformation kernels. In addition, the disclosed systems can recurrently and concurrently aggregate the transformed feature representations to generate a 3D voxel representation of the object. Furthermore, the disclosed systems can sample frustum features using the 3D voxel representation and transformation kernels. Then, the disclosed systems can utilize a patch-based neural rendering approach to render images from frustum feature patches to display a view of the object from various viewpoints.

20 Claims, 14 Drawing Sheets

(51) Int. Cl.
G06V 10/82 (2022.01)
G06V 10/44 (2022.01)
G06V 20/64 (2022.01)

(52) U.S. Cl.
CPC ........ *G06V 20/647* (2022.01); *G06T 2200/08* (2013.01); *G06T 2207/20084* (2013.01)

(56) References Cited

U.S. PATENT DOCUMENTS

| | | | |
|---|---|---|---|
| 2018/0268256 | A1 | 9/2018 | Di Febbo et al. |
| 2021/0150671 | A1* | 5/2021 | Guo .................. G16H 30/20 |
| 2021/0158561 | A1* | 5/2021 | Park .................. G06T 15/20 |
| 2021/0279952 | A1* | 9/2021 | Chen .................. G06N 3/047 |

OTHER PUBLICATIONS

Astrom, K.: Maximum likelihood and prediction error methods. IFAC Proceedings vols. 12(8), 551-574 (1979).
Cho, K., Van Merrienboer, B., Gulcehre, C., Bahdanau, D., Bougares, F., Schwenk,H., Bengio, Y.: Learning phrase representations using rnn encoder-decoder for statistical machine translation. arXiv preprint arXiv:1406.1078 (2014).
Chung, J., Gulcehre, C., Cho, K., Bengio, Y.: Gated feedback recurrent neural networks. In: International Conference on Machine Learning. pp. 2067-2075 (2015).
Flynn, J., Broxton, M., Debevec, P., DuVall, M., Fyffe, G., Overbeck, R., Snavely, N., Tucker, R.: Deepview: View synthesis with learned gradient descent. In: CVPR (2019).
Flynn, J., Neulander, I., Philbin, J., Snavely, N.: Deepstereo: Learning to predict new views from the world's imagery. In: CVPR (2016).
Gortler, S.J., Grzeszczuk, R., Szeliski, R., Cohen, M.F .: The lumigraph. In: Siggraph. vol. 96, pp. 43-54 (1996).
Hartley, R., Zisserman, A.: Multiple view geometry in computer vision. Cambridge university press (2003) pp. xi-202.
Hartley, R., Zisserman, A.: Multiple view geometry in computer vision. Cambridge university press (2003) pp. 203-422.
Hartley, R., Zisserman, A.: Multiple view geometry in computer vision. Cambridge university press (2003) pp. 423-655.
Hedman, P., Alsisan, S., Szeliski, R., Kopf, J.: Casual 3d photography. ACM Transactions on Graphics (2017).
Hedman, P., Philip, J., True Price, J.M.F., Drettakis, G., Brostow, G.J.: Deep blending for free-viewpoint image-based rendering. ACM Transactions on Graphics (2018).
Hochreiter, S., Schmidhuber, J.: Long short-term memory. Neural computation 9(8), 1735-1780 (1997).
Isola, P., Zhu, J.Y., Zhou, T., Efros, A.A.: Image-to-image translation with conditional adversarial networks. In: Proceedings of the IEEE conference on computer vision and pattern recognition. pp. 1125-1134 (2017).
Ji, D., Kwon, J., McFarland, M., Savarese, S.: Deep view morphing. In: CVPR 657 (2017).
Jin, H., Soatto, S., Yezzi, A.J.: Multi-view stereo beyond lambert. In: 2003 IEEE Computer Society Conference on Computer Vision and Pattern Recognition, 2003. Proceedings. vol. 1, pp. I-I. IEEE (2003).
Kalantari, N.K., Wang, T.C., Ramamoorthi, R.: Learning-based view synthesis for 662 light field cameras. ACM Transactions on Graphics (TOG) 35(6), 1-10 (2016).
Kang, S.B., Li, Y., Tong, X., Shum, H.Y.: Image-based rendering. Foundations and 663 Trends in Computer Graphics and Vision (2006).
Kingma, D.P., Ba, J.: Adam: A method for stochastic optimization. arXiv preprint 666 arXiv:1412.6980 (2014).
Lombardi, S., Simon, T., Saragih, J., Schwartz, G., Lehrmann, A., Sheikh, Y.: Neural volumes: Learning dynamic renderable volumes from images. ACM Transactions on Graphics (TOG) 38(4), 65 (2019).
Ma, Y., Soatto, S., Kosecka, J., Sastry, S.S.: An invitation to 3-d vision: from images to geometric models, vol. 26. Springer Science & Business Media (2012) pp. vii-137.
Ma, Y., Soatto, S., Kosecka, J., Sastry, S.S.: An invitation to 3-d vision: from images to geometric models, vol. 26. Springer Science & Business Media (2012) pp. 137-325.
Meshry, M., Goldman, D.B., Khamis, S., Hoppe, H., Pandey, R., Snavely, N., Martin-Brualla, R.: Neural rerendering in the wild. In: Proceedings of the IEEE Conference on Computer Vision and Pattern Recognition. pp. 6878-6887 (2019) ECCV-20 submission ID 3231.
Nguyen-Phuoc, T., Li, C., Theis, L., Richardt, C., Yang, Y.L.: Hologan: Unsupervised learning of 3d representations from natural images. In: Proceedings of the IEEE International Conference on Computer Vision. pp. 7588-7597 (2019).
Olszewski, K., Tulyakov, S., Woodford, O., Li, H., Luo, L.: Transformable bottleneck networks. arXiv preprint arXiv:1904.06458 (2019).
Papyan, V., Elad, M.: Multi-scale patch-based image restoration. IEEE Transactions on image processing 25(1), 249-261 (2015).
Park, E., Yang, J., Yumer, E., Ceylan, D., Berg, A.C.: Transformation-grounded image generation network for novel 3d view synthesis. In: Proceedings of the IEEE conference on computer vision and pattern recognition. pp. 3500-3509 (2017).
Paszke, A., Gross, S., Chintala, S., Chanan, G., Yang, E., DeVito, Z., Lin, Z., Desmaison, A., Antiga, L., Lerer, A.: Automatic differentiation in PyTorch. In: NIPS Autodiff Workshop (2017).
Penner, E., Zhang, L.: Soft 3d reconstruction for view synthesis. In: ACM Transactions on Graphics (2017).
Qi, C.R., Su, H., Mo, K., Guibas, L.J.: Pointnet: Deep learning on point sets for 3d classification and segmentation. In: CVPR (2017).
Schaul, T., Quan, J., Antonoglou, I., Silver, D.: Prioritized experience replay. CoRR abs/1511.05952 (2015).
Sitzmann, V., Thies, J., Heide, F., Nießner, M., Wetzstein, G., Zollhofer, M.: Deep-voxels: Learning persistent 3d feature embeddings. In: Proceedings of the IEEE Conference on Computer Vision and Pattern Recognition. pp. 2437-2446 (2019).
Sitzmann, V., Thies, J., Heide, F., Nießner, M., Wetzstein, G., Zollhofer, M.: Deep-voxels: Learning persistent 3d feature embeddings video demo. https://youtu.be/-Vto65Yxt8s?t=228 (Jun. 2019).
Sitzmann, V., Zollhofer, M., Wetzstein, G.: Scene representation networks: Continuous 3d-strcuture-aware neural scene representations. In: NeurIPS (2019).
Srinivasan, P.P., Tucker, R., Barron, J.T., Ramamoorthi, R., Ng, R., Snavely, N.: Pushing the boundaries of view extrapolation with multiplane images. In: CVPR (2019).
Su, H., Maji, S., Kalogerakis, E., Learned-Miller, E.: Multi-view convolutional neural networks for 3d shape recognition. In: Proceedings of the IEEE international conference on computer vision. pp. 945-953 (2015).
Sun, S.H., Huh, M., Liao, Y.H., Zhang, N., Lim, J.J.: Multi-view to novel view: Synthesizing novel views with self-learned confidence. In: Proceedings of the European Conference on Computer Vision (ECCV). pp. 155-171 (2018).
Tatarchenko, M., Dosovitskiy, A., Brox, T.: Single-view to multi-view: Reconstructing unseen views with a convolutional network. arXiv preprint arXiv:1511.06702 6 709 (2015).
Thies, J., Zollhofer, M., , Nießner, M.: Deferred neural rendering: Image synthesis using neural textures. In: ACM Transactions on Graphics (2019).
Thies, J., Zollhofer, M., Theobalt, C., Stamminger, M., Nießner, M.: Ignor: Image-guided neural object rendering. In: arXiv (2018).
Tung, H.Y.F., Cheng, R., Fragkiadaki, K.: Learning spatial common sense with geometry-aware recurrent networks. In: Proceedings of the IEEE Conference on Computer Vision and Pattern Recognition. pp. 2595-2603 (2019).
Worrall, D.E., Garbin, S.J., Turmukhambetov, D., Brostow, G.J.: Interpretable transformations with encoder-decoder networks. In: Proceedings of the IEEE In-ternational Conference on Computer Vision. pp. 5726-5735 (2017).
Xu, X., Chen, Y.C., Jia, J.: View independent generative adversarial network for novel view synthesis. In: Proceedings of the IEEE International Conference on Computer Vision. pp. 7791-7800 (2019).

(56) References Cited

OTHER PUBLICATIONS

Yang, J., Reed, S.E., Yang, M.H., Lee, H.: Weakly-supervised disentangling with recurrent transformations for 3d view synthesis. In: Advances in Neural Information Processing Systems. pp. 1099-1107 (2015).

Yin, X., Wei, H., Wang, X., Chen, Q., et al.: Novel view synthesis for large-scale scene using adversarial loss. arXiv preprint arXiv:1802.07064 (2018).

Yu, L., Li, X., Fu, C.W., Cohen-Or, D., Heng, P.A.: Pu-net: Point cloud upsampling network. In: Proceedings of the IEEE Conference on Computer Vision and Pattern Recognition. pp. 2790-2799 (2018).

Zhou, T., Tucker, R., Flynn, J., Fyffe, G., Snavely, N.: Stereo magnification: Learning view synthesis using multiplane images. In: ACM Transactions on Graphics (2018).

Zhou, T., Tulsiani, S., Sun, W., Malik, J., Efros, A.A.: View synthesis by appearance flow. In: European conference on computer vision. pp. 286-301. Springer (2016).

Charles Ruizhongtai Qi, Li Yi, Hao Su, and Leonidas J Guibas. Pointnet++: Deep hierarchical feature learning on point sets in a metric space. In Advances in neural information processing systems, pp. 5099-5108, 2017.

Johannes Lutz Schonberger and Jan-Michael Frahm. Structure-from-motion revisited. In Conference on Computer Vision and Pattern Recognition (CVPR), 2016.

Johannes Lutz Schonberger, Enliang Zheng, Marc Pollefeys, and Jan-Michael Frahm. Pixelwise view selection for unstructured multi-view stereo. In European Conference on 942 Computer Vision (ECCV), 2016.

U.S. Appl. No. 16/838,429, dated Oct. 14, 2021, Preinterview 1st Office Action.

U.S. Appl. No. 16/838,429, dated Dec. 16, 2021, Office Action.

U.S. Appl. No. 16/838,429, dated Mar. 31, 2022, Notice of Allowance.

* cited by examiner

UTILIZING VOXEL FEATURE TRANSFORMATIONS FOR VIEW SYNTHESIS

CROSS-REFERENCE TO RELATED APPLICATIONS

The present application is a divisional of U.S. application Ser. No. 16/838,429, filed on Apr. 2, 2020. The aforementioned application is hereby incorporated by reference in its entirety.

BACKGROUND

Recent advances in three-dimensional (3D) computer vision and graphics include novel-view synthesis. Given one or more images depicting an object, novel-view synthesis is the task of generating new images that render the object from a different viewpoint than those in the given image(s). There are several different approaches to the novel-view synthesis problem, each with their own drawbacks.

One approach to novel-view synthesis is image-based modeling. Image-based modeling methods are able to obtain high-quality results even for challenging scenarios with hand-held cameras. Image-based modeling methods, however, usually require multiple steps to perform a soft reconstruction of the object or learn image blending weights, and therefore, are prone to accumulative errors.

With the advent of convolutional neural networks (CNNs), deep-learning based methods are gaining popularity for view generation. Conventional deep-learning based methods rely heavily on optical flow estimation and generative adversarial networks. The former can maintain fine details in generated images, while the latter are good at handling large pose changes for view synthesis. A common limitation of these methods is that they lack a geometrically consistent 3D representation of the object, and thus, tend to produce inconsistent images across output views.

An emerging method for addressing the novel-view synthesis task is 3D representation learning and neural-rendering using deep networks. Some approaches include leveraging point clouds, implicit neural functions, voxel grids, and multi-plane images. The use of voxel grids has shown particular promise but conventional techniques suffer from various drawbacks. For instance, many of these voxel-grid based systems require a significant duration of time to train models to synthesize novel views from images depicting an object. In particular, in order to train a model to synthesize novel views, these graphics systems utilize a significant number of parameters in models to extract and generate feature representations to synthesize novel views. Training the significant number of parameters often requires a large amount of time. Furthermore, these voxel-grid based systems utilize sequential view observations at each feature representation update iteration within a model and, accordingly, experience slow convergence.

Furthermore, partially due to time constraints and bottlenecks caused by parameter sizes in training conventional novel view synthesis models, many conventional voxel-grid based systems also result in inaccurate rendered novel views. In particular, to reduce training time, conventional voxel-grid based systems often utilize lower resolution images of an object to synthesize and render novel views of the object. This results in a loss of detail (i.e., less accurate) in renderings of the novel views.

In addition, some conventional voxel-grid based systems introduce viewpoint biases during novel view synthesis. By doing so, such conventional systems often fail to render novel views that capture a complete 360-degree view of an object (e.g., by rendering views of an object with incomplete surfaces and/or portions). For example, some conventional voxel-grid based systems utilize novel view synthesis models that overfit at viewpoints from the training images. In turn, the overfitting often results in a reduction in surface coverage of the object within a 3D representation of the object. Indeed, due to the reduction in surface coverage, such systems often render inaccurate views of the object with incomplete surfaces and/or portions.

Moreover, conventional voxel-grid based systems often fail to render novel views of an object from images with a smooth interpolation. For instance, such systems can render novel views of an object but fail to smoothly interpolate between different viewpoints of the object at a high fidelity. For example, such conventional systems often rely on voxel volume changes caused by vantage point changes to infer view-dependency in 3D object representations. However, perspective projection effects induced by viewpoint changes can be mapped to different patterns in features that encode shape and texture of an object's local surface plane. Indeed, voxel volume differences are often constrained by the low voxel spatial resolution and only implicitly reflect viewpoints. For conventional systems, this often results in poor interpolation performance when objects have detailed shapes or training viewpoints are limited (e.g., voxel volume changes are less continuous). As such, many conventional graphics systems fail to render an accurate scene of the object as the lack of smooth interpolation prevents a realistic view of the object.

Furthermore, even after utilizing an inefficient amount of time to train conventional novel view synthesis models, many conventional voxel-grid based systems are often unable to reconstruct low-level details and sharp textures within rendered novel views of an object. For instance, conventional voxel-grid based systems typically render views of an object with accompanying artifacts such as blur, aliasing issues, and holes. Accordingly, conventional systems often fail to quickly and accurately synthesize novel views for an object from images depicting the object.

SUMMARY

The disclosure describes one or more embodiments that provide technical benefits with systems, computer-readable media, and methods that utilize an encoder-decoder architecture to learn a volumetric 3D representation of an object using digital images of the object from multiple viewpoints to render novel views of the object. In particular, the disclosed systems can utilize patch-based image feature extraction that reduces the number of parameters utilized during a learning phase to extract lifted feature representations from images corresponding to different viewpoints of an object. Furthermore, the disclosed systems can learn and utilize transformation kernels from camera pose information of the digital images to model voxel feature transformations from the lifted feature representations at the different viewpoints to generate transformed feature representations. In addition, to alleviate viewpoint biases and stabilize the training of deep voxel features from the transformed feature representations, the disclosed systems can recurrently and concurrently aggregate the transformed feature representations to generate a 3D voxel representation of the object. Furthermore, to render novel views of the object, the disclosed systems can first sample frustum features using the 3D voxel representation and transformation kernels. Then, the disclosed systems can utilize a patch-based neural rendering approach to render images from frustum feature patches to display a view of the object from various viewpoints.

BRIEF DESCRIPTION OF THE DRAWINGS

The detailed description is described with reference to the accompanying drawings in which.

DETAILED DESCRIPTION

Figure 1:
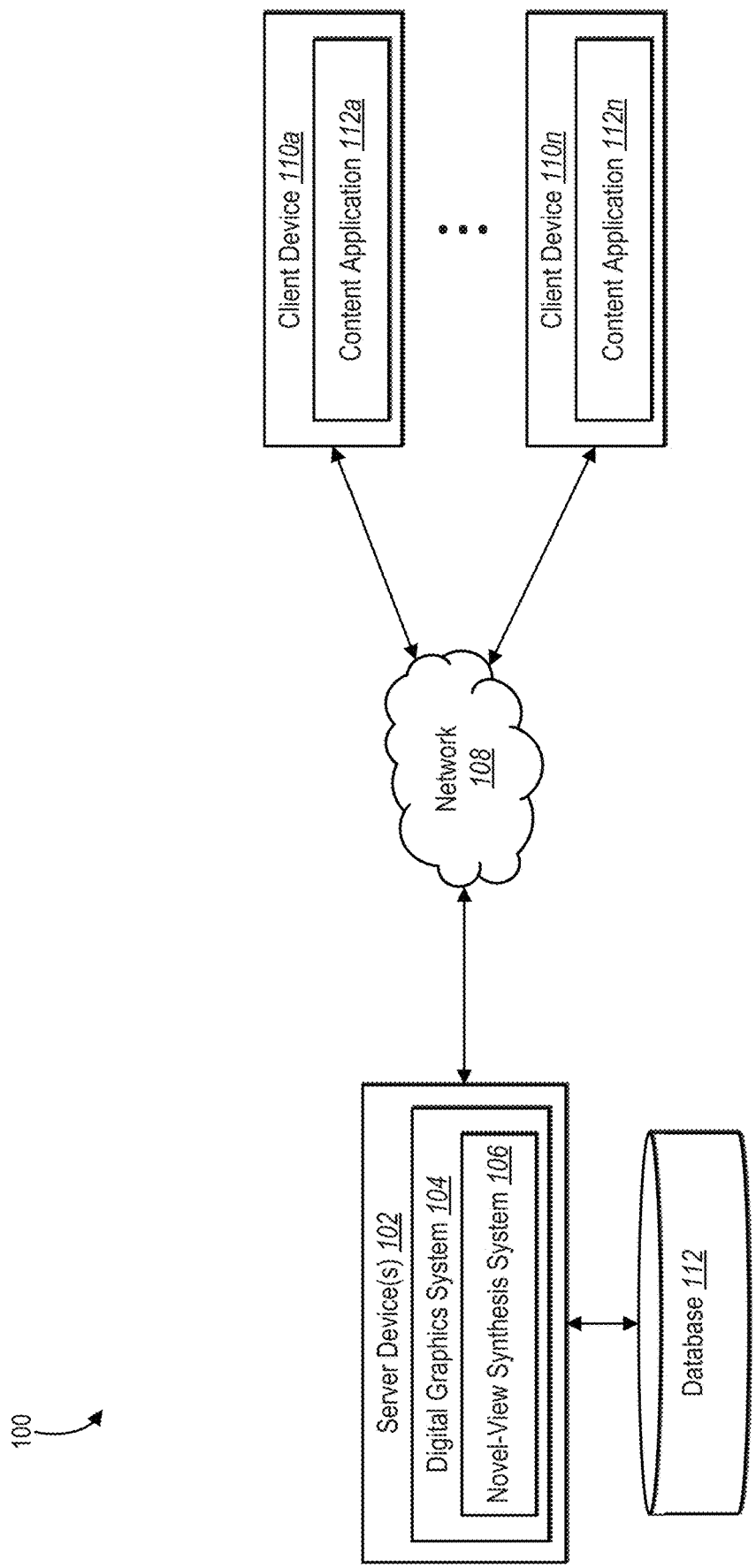
FIG. 1 illustrates a schematic diagram of an example system in which a novel-view synthesis system can operate in accordance with one or more embodiments.

One or more embodiments of the present disclosure include a novel-view synthesis system that can synthesize novel views having shape and texture information of an object from two-dimensional (2D) images of the object without explicit 3D occupancy supervision. For instance, the novel-view synthesis system can sample digital image patches from digital images that depict an object from multiple viewpoints. Then, for each viewpoint, the novel-view synthesis system can generate transformed feature representations using the digital image patches of each viewpoint and corresponding transformation kernels. Furthermore, the novel-view synthesis system can generate a 3D voxel feature representation for the object by concurrently pooling and recurrently fusing transformed feature representations from various subsets of viewpoints. Subsequently, the novel-view synthesis system can sample frustum features from the 3D voxel feature representation utilizing transformation kernels for a viewpoint. Indeed, the novel-view synthesis system can render a 2D view depicting the object from the viewpoint by decoding frustum feature patches from the sampled frustum feature for the viewpoint.

As just mentioned, the novel-view synthesis system can sample digital image patches from digital images depicting an object from multiple viewpoints. For example, the novel-view synthesis system can sample digital image patches from a digital image from a particular viewpoint. Indeed, the novel-view synthesis system can stochastically sample digital image patches from a digital image such that each viewpoint has a plurality of digital image patches.

Furthermore, the novel-view synthesis system can generate view-dependent transformed feature representations for each viewpoint. In particular, the novel-view synthesis system can generate lifted feature representations from digital image patches for a viewpoint. Moreover, utilizing camera pose information corresponding to the viewpoint, the novel-view synthesis system can learn a transformation kernel for the viewpoint. Then, the novel-view synthesis system can apply the learned transformation kernel of the viewpoint to the lifted feature representations belonging to the viewpoint to generate a transformed feature representation for the viewpoint.

Additionally, the novel-view synthesis system can generate a 3D novel feature representation by concurrently pooling and recurrently fusing transformed feature representations. In particular, the novel-view synthesis system can generate a plurality of aggregated feature representations by pooling transformed feature representations belonging to subsets of viewpoints from available viewpoints corresponding to the input digital images. For example, the novel-view synthesis system can randomly select a subset of viewpoints from the available viewpoints. Then, the novel-view synthesis system can pool the transformed features belonging to the subset of viewpoints. Furthermore, the novel-view synthesis system can fuse the plurality of aggregated feature representations using a gated recurrent unit (GRU) to generate the 3D voxel feature representation.

Upon generating the 3D novel feature representation, the novel-view synthesis system can render a 2D view using view-dependent frustum feature sampling and patch-based rendering. For instance, the novel-view synthesis system can sample a frustum feature from the 3D voxel representation using a transformation kernel learned from camera pose information corresponding to a target viewpoint. Furthermore, the novel-view synthesis system can reduce the dimensionality of the frustum feature sample. Afterwards, the novel-view synthesis system can sample frustum feature patches from the lower-dimension frustum feature. Then, the novel-view synthesis system can utilize a neural renderer on the frustum feature patches to render a 2D view of the object from the viewpoint. For example, the novel-view synthesis system can render image patches from the frustum feature patches and stitch the rendered image patches to render the 2D view of the object. Furthermore, upon training the novel-view synthesis architecture to render images from the 3D voxel feature representation, the novel-view synthesis system only requires the learned 3D voxel feature representation and the view-dependent patch-based neural rendering network (decoder) for 360 degrees novel-view synthesis of an object.

The novel-view synthesis system of one or more implementations of the present disclosure provides advantages and benefits over conventional systems and methods by quickly and accurately synthesizing novel views for an object from images depicting the object at multiple viewpoints. In particular, by utilizing patch-based extraction of feature representations, the novel-view synthesis system can utilize higher resolution images even in the presence bottlenecks (e.g., parameter limits) of a novel view synthesis encoder/decoder network (e.g., due to the small size of individual image patches). Indeed, the novel-view synthesis system is able to extract feature representations that include more detail by training on image patches from higher resolution images (and more rich-texture regions) compared to conventional graphics systems. Furthermore, by using image patch-based extraction and rendering, the novel-view synthesis system also significantly reduces (e.g., halves) network parameters used in feature representation extraction and neural rendering. As a result of the detailed feature representations, the novel-view synthesis system can render a higher quality 3D voxel representation and, ultimately, more detailed 2D views of an object.

In addition, by utilizing transformation kernels to generate view-dependent feature representations (i.e., transformed feature representations) and to sample frustum features from a 3D voxel representation, the novel-view synthesis system can provide smooth interpolation between views of an object with fewer input viewpoints. For instance, the novel-view synthesis system can explicitly model view-dependency by leveraging learned transformation kernels from voxel-camera pose tensors. As such, the novel-view synthesis system provides an accurate and view-dependent 3D representation of an object to provide smooth interpolations between views of the object compared to conventional graphics systems.

In contrast, as previously mentioned, many conventional graphics systems often rely on inferred view-dependencies and fail to render an accurate scene of the object due to a lack of smooth interpolation that prevents a realistic view of the object. By explicitly introducing view-dependency via transformation kernels during feature representation extraction and frustum feature sampling, the novel-view synthesis system renders more accurate views of an object that provide smoother interpolations between different viewpoints. Indeed, as a result of explicitly introducing view-dependency via transformation kernels, the novel-view synthesis system can produce smoother interpolations even when objects have detailed shapes and/or when there are limited training viewpoints.

Moreover, the novel-view synthesis system also reduces viewpoint biases in a 3D representation of an object and/or in novel views of an object. In particular, by generating a 3D voxel feature representation using concurrent and recurrent aggregation of feature representations from different viewpoints, the novel-view synthesis system reduces viewpoint biases in the 3D voxel feature representation. In particular, conventional graphics systems that provide representations of viewpoints in sequential order to generate a 3D object representation often introduce viewpoint biases in the 3D object representation. In contrast, the novel-view synthesis system reduces (or removes) viewpoint biases by concurrently pooling feature representations belonging to various viewpoints to generate aggregated feature representations and recurrently fusing these aggregated feature representations to generate the 3D voxel feature representation.

In addition, the novel-view synthesis system also improves the training speed of the novel synthesis encoder/decoder network by using concurrent and recurrent aggregation of feature representations from different viewpoints. Indeed, by reducing viewpoint biases, the novel-view synthesis system also reduces instabilities during training caused by viewpoint biases that increase training times. Moreover, the utilization of concurrent and recurrent aggregation of feature representations also results in a reduction of training data required to train a novel-view synthesis encoder/decoder network. For instance, in contrast to some conventional graphics systems, the novel-view synthesis system can train a novel-view synthesis encoder/decoder using one-third of the training data and with less training time while also improving the accuracy of rendered novel views of an object.

Furthermore, the novel-view synthesis system also improves the accuracy of rendered views by utilizing patch-based rendering to render a view of the object from a frustum feature. More specifically, by sampling frustum feature patches from a frustum feature and rendering images from the frustum feature patches, the novel-view synthesis system can sample a higher resolution frustum feature from a 3D voxel representation without overburdening a neural renderer (e.g., increasing parameters) when rendering an image from the frustum feature. Indeed, the novel-view synthesis system can more accurately render a higher quality 2D image having more fine-scale details of the object due to the initially sampled frustum feature (e.g., prior to sampling frustum feature patches) having a higher resolution.

Furthermore, the novel-view synthesis system can also synthesize novel views of an object from a 3D representation without having a 3D model of that object (e.g., without explicit 3D occupancy supervision). In particular, the novel-view synthesis system can construct views of an object from a 3D representation of the object without having any 3D object data for the object. Additionally, once trained and upon generating a 3D voxel feature representation for an object from multiple images depicting the object, the novel-view synthesis system can directly utilize the learned 3D voxel feature representation to render images from novel views of the object without using the original images depicting the object as reference-view inputs. In contrast, some conventional graphics systems require the use of the original images as reference-view inputs to render images from novel views even after training.

As illustrated by the foregoing discussion, the present disclosure utilizes a variety of terms to describe features and advantages of the novel-view synthesis system. Additional detail is now provided regarding the meaning of such terms. For example, as used herein, the term "image" (sometimes referred to as "digital image" and/or "2D digital image") refers to a digital symbol, picture, icon, and/or other visual illustration depicting one or more objects. For instance, an image can include a digital file having a visual illustration and/or depiction of one or more objects. To illustrate, a digital image can include, but is not limited to, a digital file with the following extensions: JPEG, TIFF, BMP, PNG, RAW, or PDF.

In addition, as used herein, the term "object" refers to an item or element with visual properties. In particular, the term "object" can refer to a person, place (e.g., a scene), and/or an item that can be visually represented. Indeed, an object can include a subject that is depicted in an image. For example, an object can include, but is not limited to, a person, a building, a landscape, or an item (e.g., a vase, furniture, cars). Furthermore, as used herein, the term "3D object" refers to an object that is depicted as a model having a height, width, and depth.

Furthermore, as used herein, the term "image patches" refers to subdivided portions (or regions) of a digital image.

In particular, the term "image patches" can refer to subdivided portions of a digital image. For instance, the novel-view synthesis system can utilize a sliding window to divide a digital image into a number of portions. Then, the novel-view synthesis system can select a subset of the portions as the image patches (e.g., using stochastic sampling).

As used herein, the term "stochastic sampling" refers to an approach of selecting image patches from a digital image by prioritizing regions of the digital image using visual properties corresponding to the regions. In particular, the term "stochastic sampling" can refer to an approach of sampling a subset of patches by prioritizing (or biasing) the sampling towards regions of a digital image that are texture rich compared to other regions of the digital image.

Additionally, as used herein, the term "viewpoint" refers to a position or vantage of perception in relation to an object. In particular, the term "viewpoint" can refer to positional information that represents a location and/or visual vantage from where an object is being visually perceived. For example, a viewpoint can include an orientation and/or position as defined by a camera pose and/or positional information from a digital image that depicts an object.

As used herein, the term "camera pose" (sometimes referred to as "camera pose information") refers to position and/or orientation information. In particular, the term "camera pose information" can refer to a position and/or orientation information of a camera in relation to an object. For example, camera pose information can include positional and/or orientation information of a camera in relation to an object depicted within a digital image produced by the camera. Indeed, camera pose information can include translational and/or rotational information for a camera model in relation to an object depicted in a digital image. In some embodiments, the novel-view synthesis system can determine camera pose information from a digital image depicting an object using structure-from-motion (SFM). Furthermore, camera pose information can include voxel-camera relative translation and/or camera pose rotation vector information.

As used herein, the term "feature map" (sometimes referred to as a "patch feature map") refers to a set of values representing characteristics and/or attributes (i.e., features) of an image or image patch. In particular, the term "feature map" can refer to a set of values corresponding to latent and/or patent attributes corresponding to a digital image. Indeed, a feature map can include a multidimensional dataset that represents low-level features of a digital image. In some embodiments, a feature map includes a set of metrics learned by a machine learning algorithm. For instance, the novel-view synthesis system can extract one or more feature maps from digital image patches and/or a digital image using a fully convolutional feature extracting network such as, but not limited to, a 2D U-Net network.

Furthermore, a lifted feature representation can include 3D observations from 2D features of a digital image. In other words, a lifted feature representation can comprise a plurality of lifted features. In particular, the novel-view synthesis system can utilize lifting layers to lift 2D features extracted from a digital image into one or more 3D observations (e.g., voxel-shape features). For example, a lifted feature representation can be determined using differentiable bi-linear feature sampling.

As used herein, the term "transformed feature representation" refers to a view-dependent feature representation of an image and/or image patches. In particular, the term "transformed feature representation" can refer to a lifted feature representation (i.e., a plurality of lifted features) that is transformed (or modified) by applying a transformation kernel (learned from camera pose information belonging to digital image patches and/or a digital image) to one or more feature representations for the digital image patches and/or the digital image. Indeed, the novel-view synthesis system can generate a transformed feature representation by utilizing a 3D convolution operation between a convolutional transformation kernel and one or more feature representations belonging to digital image patches (or a digital image). As used herein, "feature representation" encompasses lifted feature representations and transformed feature representations.

Moreover, as used herein, the term "3D convolution operation" refers to a process of applying one or more filters to an input (e.g., an image and/or feature representation) to extract one or more features from the input. In particular, the novel-view synthesis system can apply a convolutional transformation kernel to a feature representation to generate one or more output channels for a transformed feature representation. Indeed, a 3D convolutional operation can apply a convolutional transformation kernel in three directions of a lifted feature representation (e.g., height, width, and channel) to output a transformed feature representation as three-dimensional data.

As used herein, the term "convolutional transformation kernel" (sometimes referred to as a "transformation kernel") refers to a set (or array) of information learned from camera pose information. Indeed, the term "convolutional transformation kernel" can refer to one or more estimated feature transformation kernels that are generated by mapping input voxel-camera pose tensor information from camera pose information (e.g., including voxel-camera relative translation and camera pose rotation vector) using one or more 3D convolution layer. For instance, a convolutional transformation kernel can include an array of weights corresponding to aspects of camera pose information and/or view dependencies corresponding to one or more feature representations.

As used herein, the term "aggregated feature representation" refers to a combination of a plurality of feature representations (or transformed feature representations). In particular, the term "aggregated feature representation" can refer to a combination of a plurality of feature representations that represents a 3D voxel feature representation. In one or more embodiments, the novel-view synthesis system can combine a plurality of transformed feature representations using a pooling operation to generate an aggregated feature representation.

Additionally, as used herein, the term "voxel feature representation" (sometimes referred to as a "3D voxel feature representation" or a "deep voxel representation") refers to a holistic representation of an object across multiple viewpoints using voxel features learned from a plurality of lifted features from a plurality of 2D digital images depicting the object. In particular, the term "voxel feature representation" can refer to a representation of voxel features learned from feature representations (or transformed feature representations) of multiple images that depict an object to represent the object as a 3D object (e.g., viewable from multiple viewpoints). Furthermore, as used herein, the term "voxel" refers to an element of volume within a three-dimensional space (3D space). For instance, a voxel can include an array or set of information that represents a visual property within 3D space using feature representations (or transformed feature representations) corresponding to one or more images.

As used herein, the term "2D view" refers to a visual representation in 2D space (e.g., as a digital image) that is rendered from a 3D representation of an object (e.g., a 3D voxel feature representation). In particular, the term "2D view" can refer to a view of a digital image that depicts a 3D object from a target viewpoint using a 3D voxel feature representation of the object. For example, a 2D view can include a visual representation (as an image) of a 3D object for display in a computer graphics scene on a user interface.

Moreover, as used herein, the term "frustum feature" refers to a set of values representing characteristics and/or attributes (i.e., features) of a frustum. In particular, the term "frustum feature" can refer to characteristics and/or attributes of a region of space of a 3D representation of an object (e.g., the voxel feature representation) that may be rendered for display. In particular, the novel-view synthesis system can sample a frustum feature for a selected viewpoint by utilizing transformation kernels belonging to the selected viewpoint to sample a frustum feature from a voxel feature representation. Additionally, as used herein, the term "lower-dimension frustum feature" refers to a frustum feature that is reduced in dimensionality. For instance, a lower-dimension frustum feature" can include a frustum feature that is collapsed, by the novel-view synthesis system, to a lower dimension by applying weighted average feature pooling along a depth dimension of a sampled frustum feature.

As used herein, the term "frustum feature patches" refers to subdivided portions of a sampled frustum feature. In particular, the term "frustum feature patches" can refer to subdivided portions of a frustum feature that are selected (or sampled) based on properties corresponding to the subdivided portions. For example, the novel-view synthesis system can utilize a sliding window to divide a frustum feature into a number of portions. Then, the novel-view synthesis system can select a subset of the portions as the frustum feature patches (e.g., using stochastic sampling). For instance, the novel-view synthesis system can stochastically sample frustum feature patches from a frustum feature by prioritizing regions of the frustum feature using features or details of the regions. In particular, stochastic sampling of a frustum feature can include sampling a subset of patches by prioritizing the sampling towards frustum feature patches that are detail or feature rich compared to other frustum feature patches of the frustum feature.

Furthermore, as used herein, the term "neural renderer" refers to a machine learning based renderer that decodes feature representations (e.g., frustum features) into images. In particular, the term "neural renderer" can refer to a convolution based renderer that utilizes input frustum features (or frustum feature patches) to generate (or render) images. For example, a neural renderer can include a 2D U-Net with skip connections.

As used herein, the term "overlap" refers to border portions of an image. In particular, the term "overlap" can refer to border portions of multiple images that include similar visual features. For instance, an overlap can include a border portion of a first image patch that is similar to a boarder portion of a second image patch. In one or more embodiments, the novel-view synthesis system blends multiple digital image patches by, in part, removing overlaps the image patches when combining the image patches.

Turning now to the figures, FIG. 1 illustrates a schematic diagram of one embodiment of a system 100 (or environment) in which a novel-view synthesis system 106 can operate in accordance with one or more embodiments. As illustrated in FIG. 1, the system 100 includes server device(s) 102, a network, 108, client devices 110a-110n, and database 112. As further illustrated in FIG. 1, the server device(s) 102 and the client devices 110a-110n can communicate via the network 108. Although FIG. 1 illustrates the novel-view synthesis system 106 being implemented by a particular component and/or device within the system 100, the novel-view synthesis system 106 can be implemented, in whole or in part, by other computing devices and/or components in the system 100.

As shown in FIG. 1, the server device(s) 102 can include a digital graphics system 104 which further includes the novel-view synthesis system 106. In particular, the novel-view synthesis system 106 can utilize digital images depicting an object from multiple viewpoints to render novel views of the object (as a 3D object). Indeed, the novel-view synthesis system 106 can render, for display, a variety of views of an object to depict the object as a 3D object by utilizing a novel-view synthesis encoder/decoder architecture in accordance with one or more embodiments described herein.

Moreover, as shown in the embodiment of FIG. 1, the server device(s) 102 can communicate with the database 112. In particular, the database 112 can store digital images. Indeed, the novel-view synthesis system 106 can utilize digital images depicting an object, from digital images on the database 112, to render novel views of the object (as a 3D object). Furthermore, the novel-view synthesis system 106 can store 3D voxel representations, rendered views of objects, and/or other data corresponding to the novel-view synthesis encoder/decoder architecture on the database 112. In some embodiments, the database 112 can include a third-party digital image cloud service (e.g., a digital image sharing service) and the novel-view synthesis system 106 can utilize digital images from the third-party digital image cloud service. Although FIG. 1 illustrates the database 112 communicating with the server device(s) 102, the database 112 can receive digital images (or other data) from any, or any combination, of the novel-view synthesis system 106, other components of the server device(s) 102, the network 108, and/or the client devices 110a-110n. Moreover, the server device(s) 102 and the database 112 can include a variety of types of computing devices, including those explained below with reference to FIG. 13.

Additionally, as mentioned above and as shown in FIG. 1, the system 100 includes the client devices 110a-110n. In one or more embodiments, the client devices 110a-110n may include, but are not limited to, mobile devices (e.g., smartphones, tablets), laptops, desktops, or any other type of computing devices, including those explained below with reference to FIG. 11. Moreover, although not shown in FIG. 1, the client devices 110a-110n can be operated by users to perform a variety of functions. In particular, the client devices 110a-110n can perform functions such as, but not limited to, creating, storing, uploading, modifying, and/or displaying digital images (or other digital media content items). For instance, the client devices 110a-110n can communicate with the server device(s) 102 via the network 108 to provide one or more digital images to the server device(s) 102. In addition, the client devices 110a-110n can display a rendered view of an object. For example, the client devices 110a-110n can request a variety of views of an object as a 3D object for display in accordance with one or more embodiments.

Additionally, as shown in FIG. 1, the system 100 includes the network 108. As mentioned above, the network 108 can enable communication between components of the system 100. In one or more embodiments, the network 108 may include a suitable network and may communicate using any communication platforms and technologies suitable for transporting data and/or communication signals, examples of which are described with reference to FIG. 13. Furthermore, although FIG. 1 illustrates the server device(s) 102 and the client devices 110a-110n communicating via the network 108, the various components of the system 100 can communicate and/or interact via other methods (e.g., the server device(s) 102 and the client devices 110a-110n can communicate directly).

Figure 2:
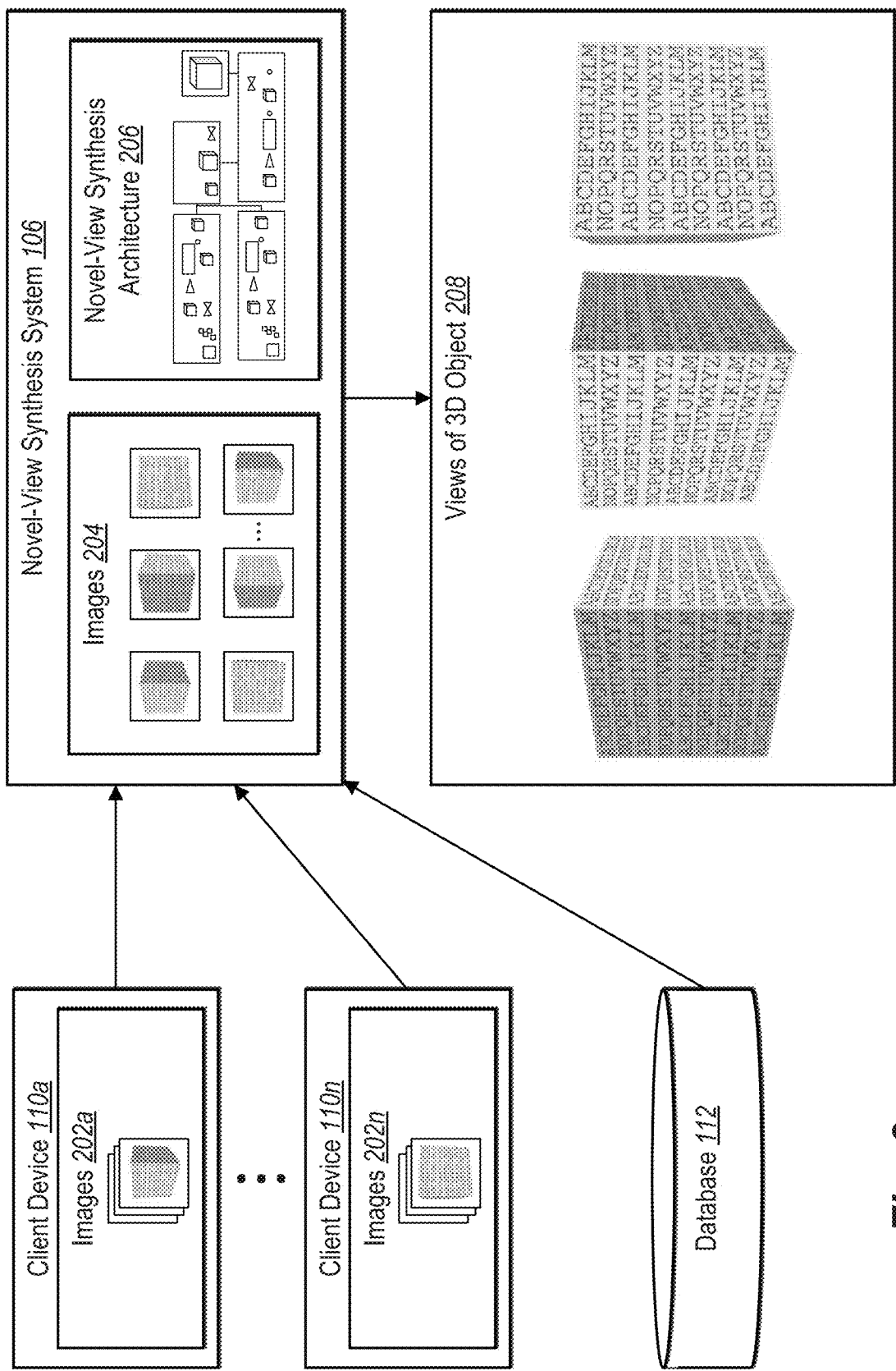
FIG. 2 illustrates a schematic diagram of a novel-view synthesis system rendering a novel-view in accordance with one or more embodiments.

As an overview, FIG. 2 illustrates the novel-view synthesis system 106 synthesizing novel views of an object from 2D images of the object. In particular, as shown in FIG. 2, the novel-view synthesis system 106 receives images 202a-202n from client devices 110a-110n depicting a particular object. Further, as illustrated in FIG. 2, the novel-view synthesis system 106 utilizes the plurality of images 204 from the images 202a-202n as input for the novel-view synthesis architecture 206 (in accordance with one or more embodiments) to render views of an object 208. Indeed, the views of the object 208 represent various viewpoints (e.g., novel views) of the particular object depicted in the plurality of images 204.

Although FIG. 2 illustrates the novel-view synthesis system 106 receiving images 202a-202n from multiple sources, the novel-view synthesis system 106 can receive images from a single or various combinations of client devices and/or databases. For instance, the novel-view synthesis system 106 can receive (or access) a plurality of images from the database 112 to render novel views having shape and texture information of an object from 2D images depicting the object. As shown in FIG. 2, the novel-view synthesis system 106 can utilize images, from various sources, depicting an object to synthesize novel views of the object and, as a result, display the object from the novel views.

Indeed, the novel-view synthesis system 106 can synthesize novel views of an object from digital images for a variety of applications. As an example, the novel-view synthesis system 106 can utilize a plurality of images of an object to provide a 3D immersive experience without requiring an actual 3D geometry or CAD model of that object. Furthermore, the novel-view synthesis system 106 can do so without requiring explicit 3D supervision. As a specific example, the novel-view synthesis system 106 can utilize a novel-view synthesis architecture (in accordance with one or more embodiments) to render appropriate viewpoints of an object from digital images within an augmented reality scene and/or a virtual reality scene.

Additionally, the novel-view synthesis system 106 can also utilize a plurality of previously produced images of an object to provide new utilizations for the images in post-production. For instance, the novel-view synthesis system 106 can render novel views from a plurality of images taken of a product to position the product differently (e.g., from a different viewpoint). For instance, the novel-view synthesis system 106 can render novel views from images of a product to place a 3D depiction of the product in a user's augmented reality or virtual reality scene or provide additional views (or a 3D model) of the product on an e-commerce website without having an existing 3D model of the product and/or having to reshoot (or reproduce) new images of the product. Indeed, the novel-view synthesis system 106 can similarly modify and/or provide additional viewpoints of a digital video in post-production.

Furthermore, the novel-view synthesis system 106 can also render novel views (or 3D object displays) of an object depicted in a plurality of images for virtual tourism. For instance, the novel-view synthesis system 106 can receive (or obtain) a plurality of images that depict a tourist attraction or monument (e.g., the Golden Gate Bridge) and display a 3D version of that tourist attraction or monument in virtual reality. Indeed, the plurality of images depicting the tourist attraction or monument can be obtained from a digital image cloud service and/or crowdsourced from users.

As another example, the novel-view synthesis system 106 can utilize the novel-view synthesis architecture (in accordance with one or more embodiments) on one or more images in visual matching applications (e.g., visual search, localization). For instance, the novel-view synthesis system 106 can match (or locate) images of an object from an untrained query view (of a query image). Moreover, the novel-view synthesis system 106 can utilize the novel-view synthesis architecture (in accordance with one or more embodiments) to perform unsupervised learning from synthetic 3D scenes (e.g., learn and render hidden non-rendered-portions of a synthetic 3D scene from viewable features of the synthetic 3D scene). Although various applications are described above with regard to the novel-view synthesis system 106, the novel-view synthesis system 106 can utilize the novel-view synthesis architecture for a number of other applications.

As mentioned above, the novel-view synthesis system 106 can utilize a novel-view synthesis encoder-decoder architecture to learn a volumetric 3D representation of an object using digital images of the object from multiple viewpoints to render novel views of the object. More specifically, the novel-view synthesis system 106 can utilize a novel-view synthesis encoder-decoder architecture that builds upon and provides technical improvements over the architecture and techniques described in Sitzmann et al., *DeepVoxels: Learning Persistent 3D Feature Embeddings*, In Proceedings of the IEEE Conference on Computer Vision and Pattern Recognition, pages 2437-2446, Apr. 11, 2019 (hereinafter DeepVoxels), the entire contents of which are hereby incorporated by references.

Figure 3:
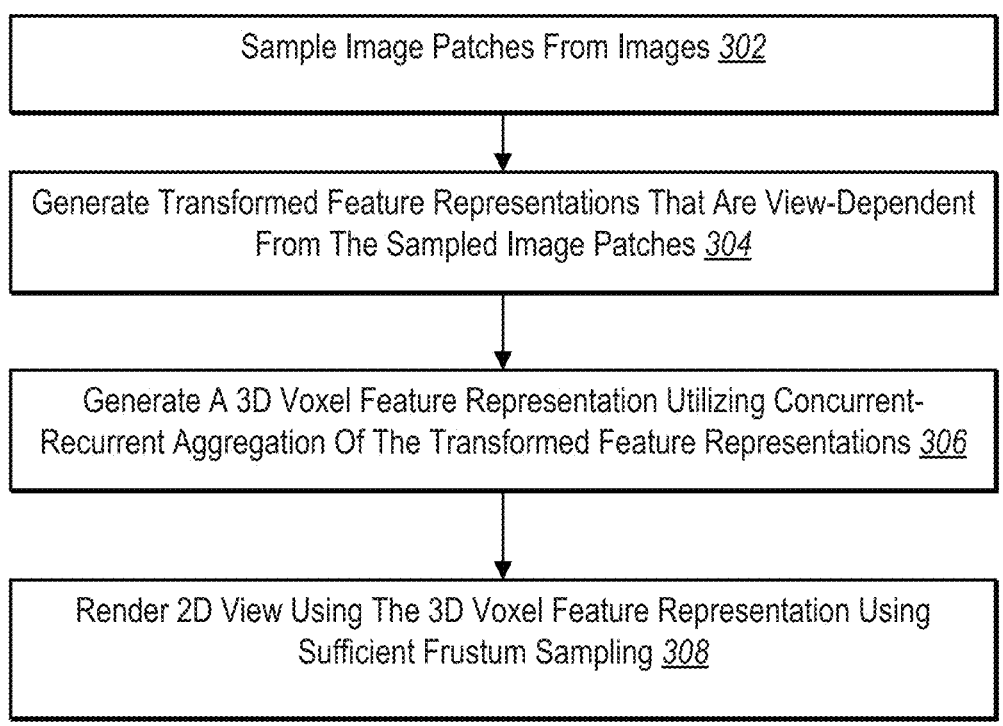
FIG. 3 illustrates an overview of a novel-view synthesis system rendering 2D views of an object from a plurality of digital images depicting the object in accordance with one or more embodiments.

FIG. 3 illustrates an overview of a process of one or more implementations that the novel-view synthesis system 106 performs to render views (e.g., novel views) of an object by learning a 3D voxel feature representation for the object (e.g., using an architecture as fully illustrated in FIG. 8) that highlights the technical advancements over the system and methods of DeepVoxels referenced above. Additional detail of the process summarized relative to FIG. 3 is provided in connection with FIGS. 4-8 below. More specifically, FIG. 3 illustrates a flowchart of the novel-view synthesis system 106 sampling image patches from images, generating view-dependent transformed feature representations from the image patches, generating a 3D voxel feature representation using concurrent-recurrent aggregation of the transformed feature representation, and rendering a 2D view (e.g., a novel view) of the object using the 3D voxel feature representation (via view-dependent frustum sampling and patch-based neural rendering).

In particular, as shown in FIG. 3, the novel-view synthesis system 106 samples image patches from images in an act 302. For example, the novel-view synthesis system 106 can sample image patches from a source image of an object belonging to a particular viewpoint. Likewise, the novel-view synthesis system 106 can sample image patches from each source image of multiple viewpoints. The novel-view synthesis system 106 can then use the sampled image patches as input to the system rather than entire images or downsampled entire images. More particularly, the novel-view synthesis system 106 can extract feature representations from the sampled image patches as described below.

Utilizing patch-based extraction of feature representations, the novel-view synthesis system 106 can utilize higher resolution images even in the presence of bottlenecks (e.g., parameter limits) of a novel view synthesis encoder/decoder network (e.g., due to the small size of individual image patches). Indeed, the novel-view synthesis system is able to extract feature representations that include more detail by utilizing image patches from higher resolution images (and more rich-texture regions) compared to using entire images or downsampled images. Furthermore, by using image patch-based extraction, the novel-view synthesis system 106 also significantly reduces (e.g., halves) network parameters used in feature representation extraction and neural rendering. The use of image patch-based extraction also allows the novel-view synthesis system 106 to reduce the complexity of large content modeling (e.g., 512×512×3). The use of image patch-based extraction also enables the novel-view synthesis system 106 to perform image modeling/rendering at arbitrarily large resolution. This is in contrast to full-image or downsampled image based system that are not easily trainable at high resolution. Additional detail regarding sampling image patches is provided below (e.g., in relation to FIG. 4).

As mentioned above, the novel-view synthesis system 106 can extract feature representations from the sampled image patches. In particular, as shown by FIG. 3, the novel-view synthesis system 106 can generate transformed feature representations that are view dependent from the sampled images patches in act 304. For instance, the novel-view synthesis system 106 can, for each viewpoint, extract feature representations from image patches belonging to a viewpoint. The novel-view synthesis system 106 can then lift patch features from the different viewpoints. In addition, the novel-view synthesis system 106 can utilize camera pose information from source images of each viewpoint to learn transformation kernels for each viewpoint. Subsequently, the novel-view synthesis system 106 can apply the learned transformation kernels to the lifted feature representations to generate transformed feature representations that are view dependent.

As such, the novel-view synthesis system 106 can explicitly model voxel feature view-dependency. This is in contrast to previous methods that rely on voxel volume changes caused by vantage point changes to infer (rather than explicitly modeling) view-dependency. By explicitly introducing view-dependency via transformation kernels during feature representation extraction and frustum feature sampling, the novel-view synthesis system renders more accurate views of an object that provide smoother interpolations between different viewpoints. Indeed, as a result of explicitly introducing view-dependency via transformation kernels, the novel-view synthesis system can produce smoother interpolations even when objects have detailed or delicate shapes and/or when there are limited training viewpoints where voxel volume changes are less continuous and less effective for view-dependency modeling. Additional detail regarding generating transformed feature representations is provided below (e.g., in relation to FIGS. 5A and 5B).

Moreover, as illustrated in FIG. 3, the novel-view synthesis system 106 can generate a 3D voxel feature representation utilizing concurrent-recurrent aggregation of the transformed feature representations in act 306. In particular, the novel-view synthesis system 106 can utilize concurrent pooling and recurrent fusing of transformed feature representations belonging to various viewpoints to generate the 3D voxel feature representation. For example, the novel-view synthesis system 106 can utilize a pooling operation to generate a plurality of aggregated feature representations from transformed feature representations belonging to various subsets of viewpoints. Subsequently, the novel-view synthesis system 106 can fuse (e.g., using gated-recurrent units GRUs) the plurality of aggregated feature representations to generate the 3D voxel feature representation.

By generating a 3D voxel feature representation using concurrent and recurrent aggregation of transformed feature representations from different viewpoints, the novel-view synthesis system 106 can reduce viewpoint biases in the 3D voxel feature representation. In particular, computer vision techniques can use recurrent (e.g., GRUs and long short term memory (LSTM)) networks for image based modeling. Because recurrent networks are designed for sequential data, however, recurrent networks break the concurrent nature of multi-view images. As such, each iteration of feature updating is biased towards the observation pose. In contrast, the novel-view synthesis system reduces (or removes) viewpoint biases by concurrently pooling feature representations belonging to various viewpoints to generate aggregated feature representations and recurrently fusing these aggregated feature representations to generate the 3D voxel feature representation. By utilizing concurrent-recurrent voxel representation aggregation, the novel-view synthesis system 106 can lead to better visual quality, as shown in greater detail below.

In addition, by using concurrent and recurrent aggregation of feature representations from different viewpoints, the novel-view synthesis system 106 can improve the training speed of the novel synthesis encoder/decoder network. Indeed, by reducing viewpoint biases, the novel-view synthesis system 106 can reduce instabilities during training caused by viewpoint biases that lead to increased training times. Moreover, the utilization of concurrent and recurrent aggregation of feature representations also results in a reduction of training data required to train a novel-view synthesis encoder/decoder network. For instance, the novel-view synthesis system can train a novel-view synthesis encoder/decoder using one-third of the training data and with less training time while also improving the accuracy of rendered novel views of an object compared to DeepVoxels. Additional detail regarding generating a 3D voxel feature representation utilizing concurrent-recurrent aggregation is provided below (e.g., in relation to FIGS. 6A and 6B).

In addition, as shown by act 308 in FIG. 3, the novel-view synthesis system 106 can render a 2D view using the 3D voxel feature representation utilizing frustrum representation sufficient sampling. More specifically, the novel-view synthesis system 106 can sample a frustum feature by utilizing a transformation kernel learned from a particular viewpoint with the 3D voxel feature representation. Then, the novel-view synthesis system 106 can determine a lower-dimension frustum feature from the sampled frustum feature and sample frustum feature patches from the lower-dimension frustum feature. Indeed, the novel-view synthesis system 106 can render individual image patches from the individual frustum feature patches and blend the individual image patches to render a 2D view of an object to represent the object from a variety of novel viewpoints.

By utilizing sufficient frustum sampling, the novel-view synthesis system 106 can sample a higher resolution frustum feature from a 3D voxel representation without overburdening a neural renderer (e.g., increasing parameters) when rendering an image from the frustum feature. Indeed, the novel-view synthesis system can more accurately render a higher quality 2D image having more fine-scale details of the object due to the initially sampled frustum feature (e.g., prior to sampling frustum feature patches) having a higher resolution. Indeed, the user of sufficient frustum sampling can allow the novel-view synthesis system 106 to alleviate the issue of limited voxel resolution, reduce blurring artifacts, and preserve sharp details. Additional detail regarding rendering a 2D view using view-dependent sufficient frustum feature sampling and patch-based rendering is provided below (e.g., in relation to FIG. 7).

As noted above, the acts 302-308 highlight the technical advances of the novel-view synthesis system 106 over the current state of the art techniques. As explained in greater detail below, while a combination of each of the above-summarized technical advances can produce the highest visual quality novel-view rendering output, each technical advance in and of itself provides improvement over the state of the art. Thus, in one or more implementations, the novel-view synthesis system 106 can utilize at least one of, a subset of, or all of patch-based image sampling, transformed feature representations that are view dependent, concurrent-recurrent voxel feature aggregation, sufficient frustum sampling, and/or view-dependent feature transformation in projection.

Figure 4:
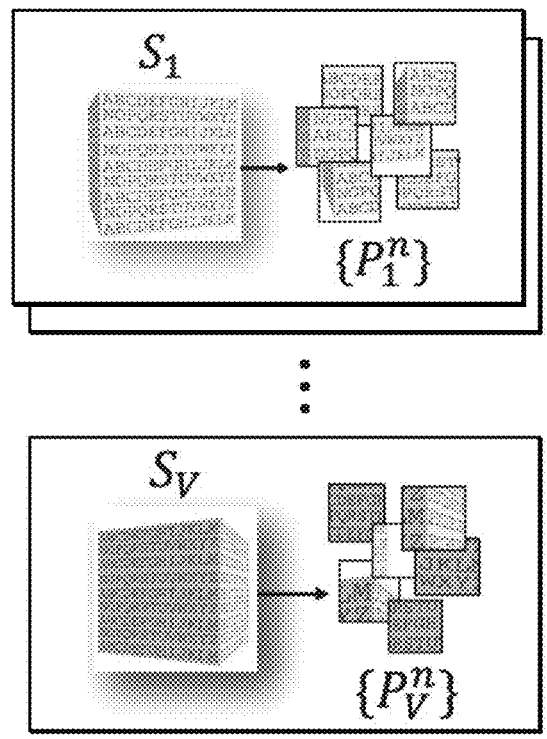
FIG. 4 illustrates a novel-view synthesis system sampling image patches in accordance with one or more embodiments.

As mentioned above, to learn a 3D voxel feature representation, the novel-view synthesis system 106 can sample image patches from an image depicting an object from a particular viewpoint. For example, as shown in FIG. 4, the novel-view synthesis system 106 samples image patches $\{P_1^n\}$ from a first source image $S_1$ belonging to a first viewpoint. Moreover, as illustrated in FIG. 4, the novel-view synthesis system 106 samples image patches $\{P_V^n\}$ from a Vth source image (e.g., $S_V$) belonging to a Vth viewpoint. Indeed, the novel-view synthesis system 106 can sample image patches from each image from a plurality of images that belong to different viewpoints (e.g., each image belongs to a different viewpoint).

Indeed, in some embodiments, the novel-view synthesis system 106 densely samples image patches from a plurality of images (depicting an object) captured at multiple viewpoints. In particular, the novel-view synthesis system 106 can subdivide each source image ($S_i$) into image patches $\{P_i^n\}_{n=1}^N$ via a sliding window with overlaps. For example, in one or more embodiments, a sliding window is a region of fixed width and height that scans or "slides" across a source image to obtain image patches from the source image.

Additionally, the source images ($S_i$) can be high resolution images (e.g., 512×512×512×3). For instance, the novel-view synthesis system 106 can sample the image patches $\{P_i^n\}_{n=1}^N$ randomly (e.g., a threshold percentage of image patches from the total available image patches from a source image). Then, the novel-view synthesis system 106 can sample a subset of image patches $\{P_i^n\}_{n=1}^{N'}$.

For instance, the novel-view synthesis system 106 can utilize a stochastic sampling approach (e.g., a priority sampling technique used in reinforcement learning approaches) to sample the subset of image patches $\{P_i^n\}_{n=1}^{N'}$. As an example, the novel-view synthesis system 106 can utilize photo metric complexities (e.g., visual properties) corresponding to image patches to sample the subset of image patches. In particular, the novel-view synthesis system 106 can identify image patches that are richer in texture to sample those image patches. In some embodiments, the novel-view synthesis system 106 utilizes an entropy associated with an image patch (e.g., corresponding to visual properties such as textures) to select the subset of image patches. Indeed, in one or more embodiments, the novel-view synthesis system 106 will sample a high entropy image patch (e.g., having a higher amount of texture) from a source image more often compared to low entropy image patches from the source image.

As shown in FIG. 4, the novel-view synthesis system 106 can sample subsets of image patches from each source image ($S_i$) belonging to a different viewpoint using stochastic sampling. Furthermore, in some embodiments, the novel-view synthesis system 106 initially samples image patches from a source image using stochastic sampling without randomly sampling patches at an initial point. Indeed, in some embodiments, the novel-view synthesis system 106 utilizes a subset of image patches if the source image resolution is significantly large and available hardware (e.g., GPU) size cannot train on all N image patches $\{P_i^n\}_{n=1}^{N'}$.

As mentioned above, the novel-view synthesis system 106 can generate transformed feature representations for various viewpoints using image patches corresponding to the viewpoints. Indeed, the novel-view synthesis system 106 can generate a transformed feature representation that is view-dependent for each available viewpoint (e.g., via each source image). For instance, FIG. 5A illustrates the novel-view synthesis system 106 generating a plurality of transformed feature representations using image patches corresponding to separate viewpoints.

Figure 5A:
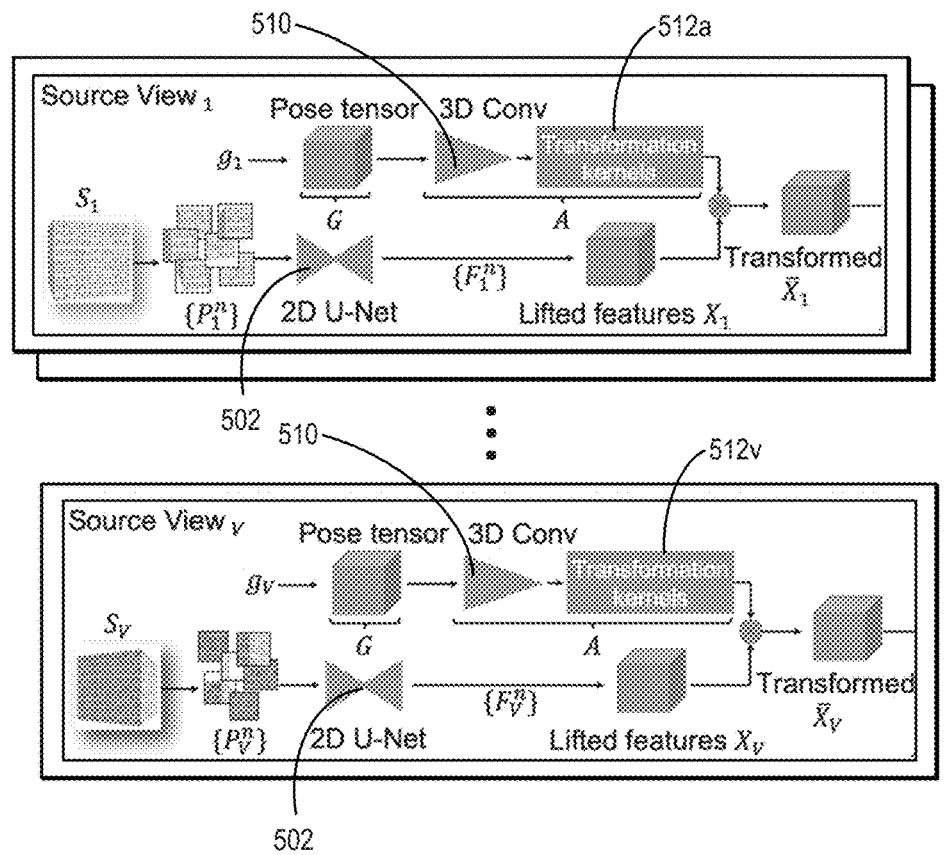
FIGS. 5A-5B illustrate a novel-view synthesis system generating view-dependent transformed feature representations in accordance with one or more embodiments.

As illustrated in FIG. 5A, the novel-view synthesis system 106 can extract feature maps from image patches (e.g., using camera pose information). In particular, as shown in FIG. 5A, the novel-view synthesis system 106 utilizes a 2D U-Net 502 on the image patches $\{P_1^n\}$ from the first source image $S_1$ to extract feature maps $\{F_1^n\}$. For example, in one or more embodiments, the novel-view synthesis system 106 encodes image patches via the 2D U-Net (with skip connections for feature extraction: $P_i^n \mapsto F_i^n$ (e.g., feature maps)). As shown by FIG. 5A, the novel-view synthesis system 106 can extract feature maps $\{F_V^n\}$ from the Vth source image $S_V$. In other words, the novel-view synthesis system 106 can extract feature maps from image patches for each source image.

The novel-view synthesis system 106 can then generate lifted features $X_i$ (also referred to as voxel-shape features or a lifted feature representation) from the feature maps $\{F_i^n\}$. In particular, in some embodiments, the novel-view synthesis system 106 utilizes structure-from-motion (SFM) to obtain camera pose information (as described below). Then, the novel-view synthesis system 106 computes a point cloud centroid in order to define s×s×s cubic voxels for aggregating lifted 2D feature maps. Furthermore, the novel-view synthesis system 106 can also compute the point cloud centroid in order to define s×s×s cubic voxels. Subsequently, the novel-view synthesis system 106 can obtain a voxel space that (tightly) encloses the object point clouds by aligning the point cloud centroid with a voxel center and determining a suitable voxel scale. Then, the novel-view synthesis system 106 can project each voxel center onto the extracted feature maps $\{F_i^n\}_{n=1}^{N'}$. Furthermore, the novel-view synthesis system 106 can perform differentiable bi-linear feature sampling to generate a voxel-shape lifted feature representations $X_i \in \mathbb{R}^{c \times s \times s \times s}$ (e.g., lifted feature representations $X_1$-$X_V$). Thus, the novel-view synthesis system 106 can utilize the camera pose information when generating the lifted feature representations.

In addition, as shown in FIG. 5A, the novel-view synthesis system 106 can utilize camera pose information to learn a convolutional transformation kernel for a viewpoint. For example, FIG. 5A illustrates the novel-view synthesis system 106 inputting camera pose information $g_1$ into a camera pose tensor G for the first viewpoint corresponding to the image patches $\{P_1^n\}$ from the first source image $S_1$. Moreover, as shown in FIG. 5A, the novel-view synthesis system 106 also inputs camera pose information $g_V$ into a camera pose tensor for the Vth viewpoint corresponding to the image patches $\{P_V^n\}$ from the first source image $S_V$. Indeed, the novel-view synthesis system 106 can determine camera pose information (or the camera pose tensor) from each source image belonging to each particular viewpoint as illustrated in FIG. 5A.

In one or more embodiments, the novel-view synthesis system 106 can determine camera pose information for a viewpoint using a structure-from-motion (SFM) approach on a source image corresponding to a viewpoint (e.g., the camera pose information $g_1$-$g_V$ in FIG. 5A). In particular, the novel-view synthesis system 106 can estimate and construct camera pose information (e.g., as a three-dimensional structure) from a 2D image of an object by utilizing a motion field of the object or scene (e.g., movement between images). As mentioned above, the camera pose information can include translational and/or rotational information for a camera model in relation to an object depicted in the source image.

Furthermore, the novel-view synthesis system 106 can input camera pose information of an image into a camera pose tensor G. Indeed, the novel-view synthesis system 106 can utilize a voxel-camera relative pose tensor $G(g_i) \in \mathbb{R}^{6 \times s \times s \times s}$ (e.g., for s×s×s cubic voxels). For instance, the novel-view synthesis system 106 can, for each entry of $G(g_i)$ (e.g., from camera pose information), provide six degrees of freedom which include a voxel-camera relative translation and a camera pose rotation vector.

Then, as shown in FIG. 5A, the novel-view synthesis system 106 can utilize the camera pose tensor G with a 3D convolution layer 510 to learn convolutional transformation kernels 512a (for the first viewpoint). In addition, as illustrated in FIG. 5A, the novel-view synthesis system 106 can utilize camera pose tensor G with the 3D convolution layer 510 to learn convolutional transformation kernels 512v (for the Vth viewpoint). Indeed, the novel-view synthesis system 106 can learn convolutional transformation kernels for each source image belonging to each particular viewpoint as shown in FIG. 5A.

In one or more embodiments, the novel-view synthesis system 106 utilizes one or more 3D convolution layers (e.g., 3D convolution layer 510) to map camera and voxel-camera pose tensors $G(g_i)$ into convolutional transformation kernels 512a-512v. In particular, the novel-view synthesis system 106 learns convolutional transformation kernels (or convolutional feature transformation kernels) $A(G(g_i)) \in \mathbb{R}^{c \times c \times 1 \times 1 \times 1}$. Indeed, the novel-view synthesis system 106 utilizes a kernel estimation network A(•) that is implemented as one or more 3D convolution layers that utilizes a voxel-camera relative pose tensor $G(g_i) \in \mathbb{R}^{6 \times s \times s \times s}$ as input to estimate the convolutional transformation kernels (e.g., convolutional transformation kernels 512a-512v).

For instance, the novel-view synthesis system 106 can utilize a projection operation (e.g., differentiable bi-linear feature sampling) that is approximated via a differentiable pin-hole camera model to learn a transformation kernel. For example, the novel-view synthesis system 106 can rectify an intrinsic matrix $K \in \mathbb{R}^{3 \times 3}$ belonging to image patches $P_i^n$ to map world-coordinate locations onto the extracted feature patches $F_i^n$ (e.g., due to size differences between an image patch and its corresponding feature patch such as in aspect ratios) as the transformation kernels (e.g., convolutional transformation kernels 512a-512v).

For instance, the novel-view synthesis system 106 can rectify an intrinsic matrix K to obtain a rectified intrinsic matrix $K_r$ in accordance with the following:

$$K_r = \begin{bmatrix} \alpha f_x & & \alpha c_x \\ & \beta f_y & \beta c_y \\ & & 1 \end{bmatrix}$$

in which ($f_x$, $f_y$, $c_x$, $c_y$) belong to intrinsic matrix K (of an image patch). For example, ($f_x$ and $f_y$) can represent focal lengths and ($c_x$ and $c_y$) can represent optical centers. Indeed, $K_r$ is the rectified intrinsic matrix used in voxel projection, by the novel-view synthesis system 106, in which ($\alpha$, $\beta$) are (width, height) ratios between feature patches $F_i^n$ and image patches $P_i^n$.

Furthermore, as illustrated in FIG. 5A, the novel-view synthesis system 106 can generate a transformed feature representation $\overline{X}_1$ (for the first viewpoint) by applying the convolutional transformation kernels 512a to the lifted features $X_1$ or in other words the lifted feature representation $X_1$. Additionally, as shown in FIG. 5A, the novel-view synthesis system 106 can generate a transformed feature representation $\overline{X}_V$ (for the Vth viewpoint) by applying the convolutional transformation kernels 512v to the lifted features $X_V$ or in other words the lifted feature representation $X_V$. Indeed, in one or more embodiments, the novel-view synthesis system 106 utilizes a 3D convolution operation between the convolutional transformation kernels and the lifted feature representations (i.e., lifted features) to generate the transformed feature representations $\overline{X}_1$-$\overline{X}_V$. Moreover, as shown in FIG. 5A, the novel-view synthesis system 106 can generate a transformed feature representation for each source image belonging to each particular viewpoint.

In one or more embodiments, the novel-view synthesis system 106 generates transformed feature representations by applying the learned convolutional transformation kernels $A(G(g_i)) \in \mathbb{R}^{c \times c \times 1 \times 1 \times 1}$ (e.g., convolutional transformation kernels 512a-512v) on the lifted features $X_i$ (i.e., lifted feature representation $X_i$) to generate transformed feature representations $\overline{X}_i$ (e.g., the transformed feature representations $\overline{X}_1$-$\overline{X}_V$). In particular, the novel-view synthesis system 106 can generate transformed feature representations $\overline{X}_i \in \mathbb{R}^{c \times s \times s \times s}$ using the following equation:

$$\overline{X}_i = A(G(g_i)) \otimes X_i.$$

Indeed, the novel-view synthesis system 106 can represent $\otimes$ as a 3D convolution operation between the learned convolutional kernels $A(G(g_i))$ (e.g., convolutional transformation kernels 512a-512v) and the lifted (2D) feature representation $X_i$ to generate 3D transformed feature representations $\overline{X}_i$ at each viewpoint. For example, in some embodiments, the 3D transformed feature representations $\overline{X}_i$ are lifted and transformed feature representations of the object at various viewpoints.

Figure 5B:
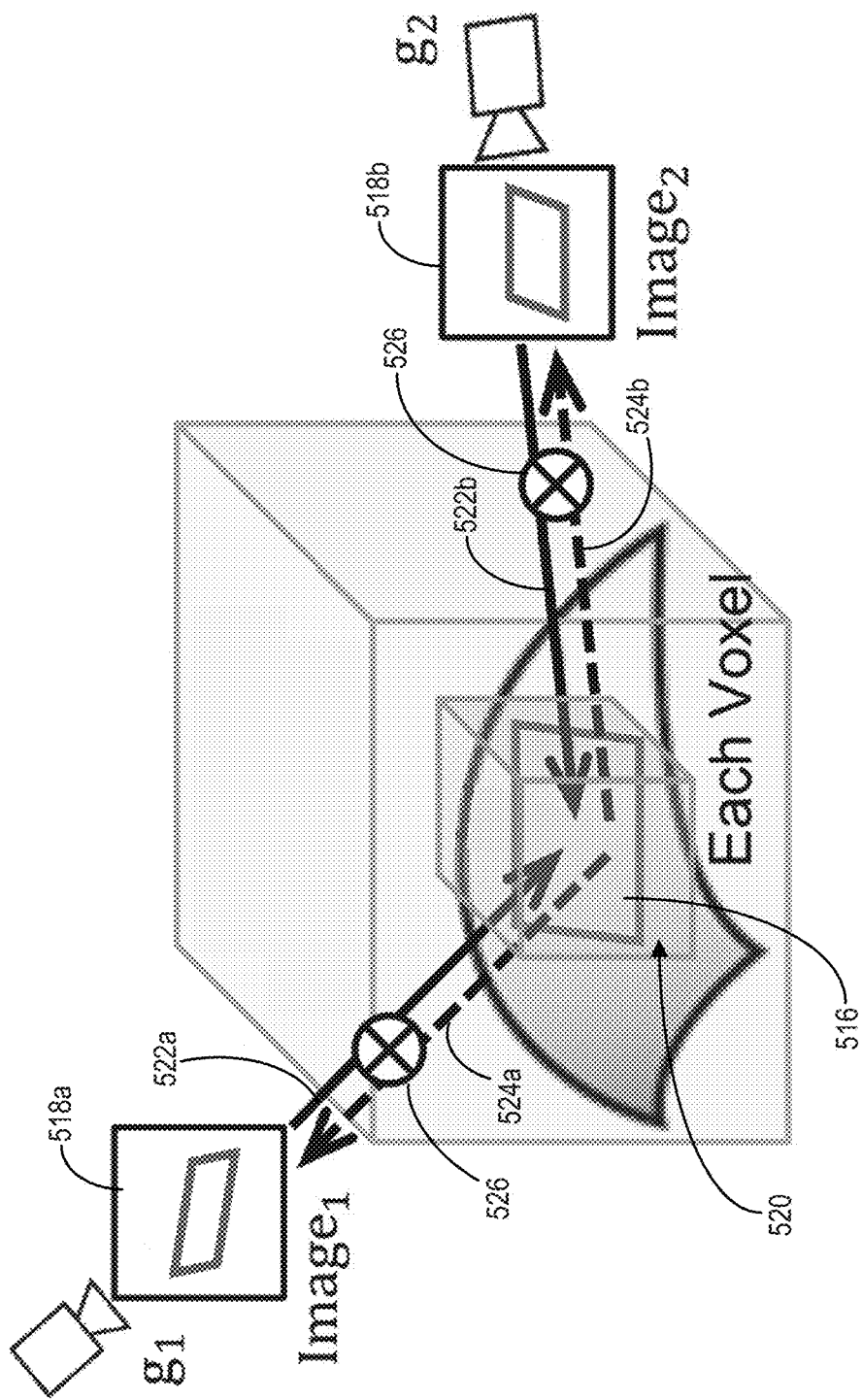

Indeed, the novel-view synthesis system 106 introduces view-dependency modeling during feature representation lifting and projection to model a local surface region of an object from different viewpoints. For example, FIG. 5B illustrates how a plurality of voxels (e.g., deep voxels) can be considered to model a local surface region of an object. Indeed, as shown in FIG. 5B, an object surface 516 is perceived differently at different camera poses 518a and 518b in a voxel 520. Accordingly, at each camera pose 518a-518b, the novel-view synthesis system 106 can perform feature representation lifting 522a and 522b and projection 524a and 524b during transformation operation 526 (to generate the various representations of a surface region of an object via transformed feature representations at different viewpoints).

Having generated transformed feature representations that are view-dependent, the novel-view synthesis system 106 can generate a 3D voxel feature representation using concurrent pooling and recurrent fusing of the transformed feature representations. In particular, the novel-view synthesis system 106 can generate aggregated feature representations that corresponds to a representation of an object from different multiple view observations by pooling transformed feature representations from the different multiple viewpoints. Furthermore, the novel-view synthesis system 106 fuse multiple aggregated feature representations using a GRU to ultimately generate a 3D voxel feature representation of the object.

Figure 6A:
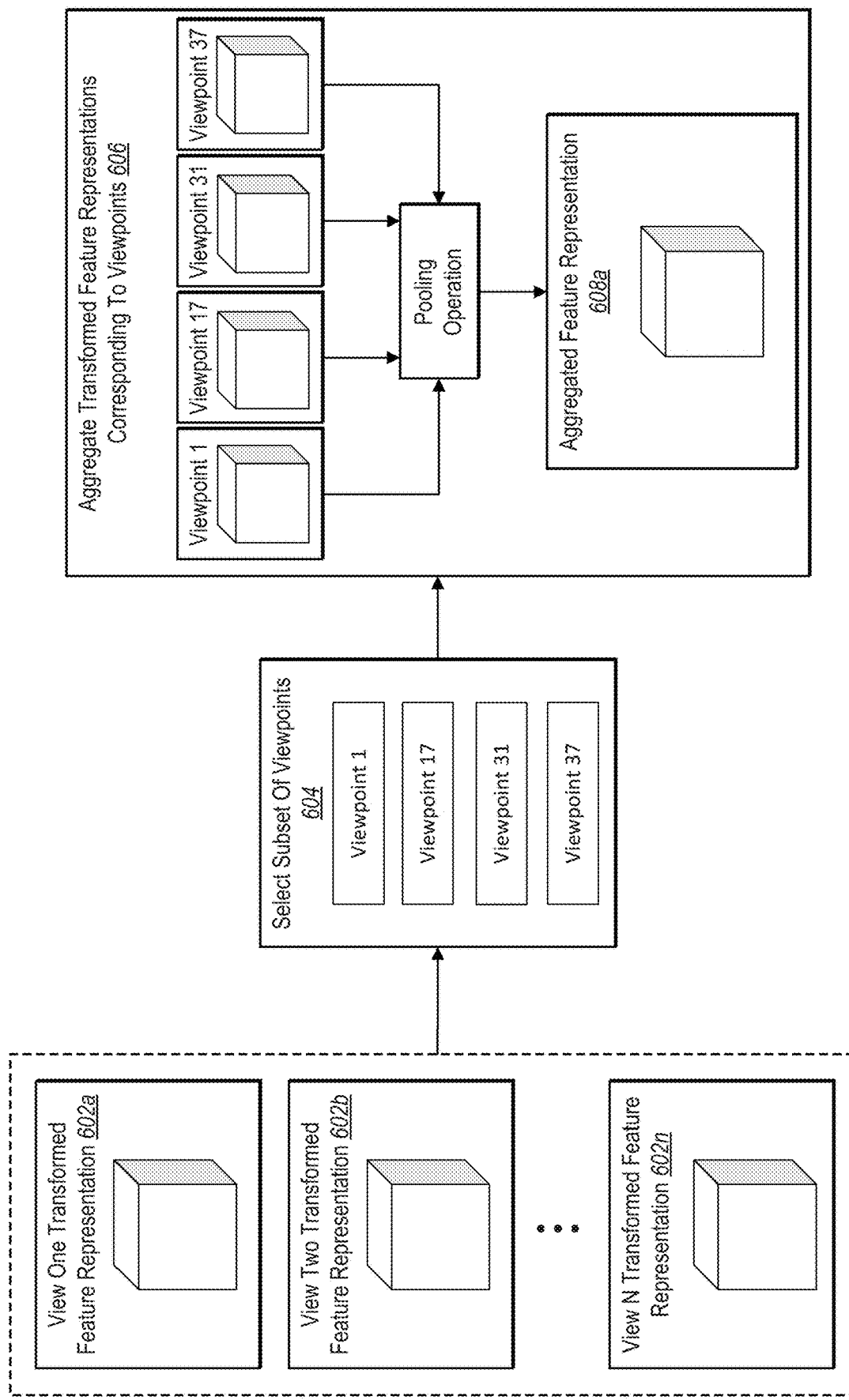
FIGS. 6A-6B illustrate a novel-view synthesis system utilizing concurrent-recurrent aggregation to generate a voxel feature representation in accordance with one or more embodiments.

For instance, FIG. 6A illustrates the novel-view synthesis system 106 concurrently pooling transformed feature representations belonging to subsets of viewpoints. In particular, as shown in FIG. 6A, the novel-view synthesis system 106 selects a subset of viewpoints in an act 604 from viewpoints of transformed feature representations 602-602n. Then, as shown in FIG. 6A, the novel-view synthesis system 106 aggregates transformed feature representations corresponding to the subset of viewpoints (from act 604) in an act 606 using a pooling operation to generate an aggregated feature representation 608a.

In one or more embodiments, the novel-view synthesis system 106 selects a subset of viewpoints (to generate an aggregated feature representation from transformed feature representations of the subset of viewpoints) by randomly selecting a threshold number of viewpoints that are available from viewpoints corresponding to source images of an object. Indeed, in some embodiments, the novel-view synthesis system 106 can repeatedly select random subsets of viewpoints and generate a plurality of aggregated feature representations (e.g., aggregated feature representations 608a-608n from FIG. 6B) using a pooling operation on transformed feature representations (or feature representations) of the subsets of viewpoints. For instance, the novel-view synthesis system 106 can randomly select four viewpoints in each subset of viewpoints and generate aggregated feature representations from the transformed feature representations belonging to those viewpoints.

Furthermore, although one or more embodiments illustrate the novel-view synthesis system 106 randomly selecting viewpoints, the novel-view synthesis system 106 can utilize a heuristic approach to select viewpoints from the available viewpoints. For instance, the novel-view synthesis system 106 can select viewpoints using a farthest point sampling approach. Moreover, although, one or more embodiments illustrate the novel-view synthesis system 106 selecting four viewpoints in each subset of viewpoints, the novel-view synthesis system 106 can select a various numbers of viewpoints in each subset of viewpoints.

Figure 6B:
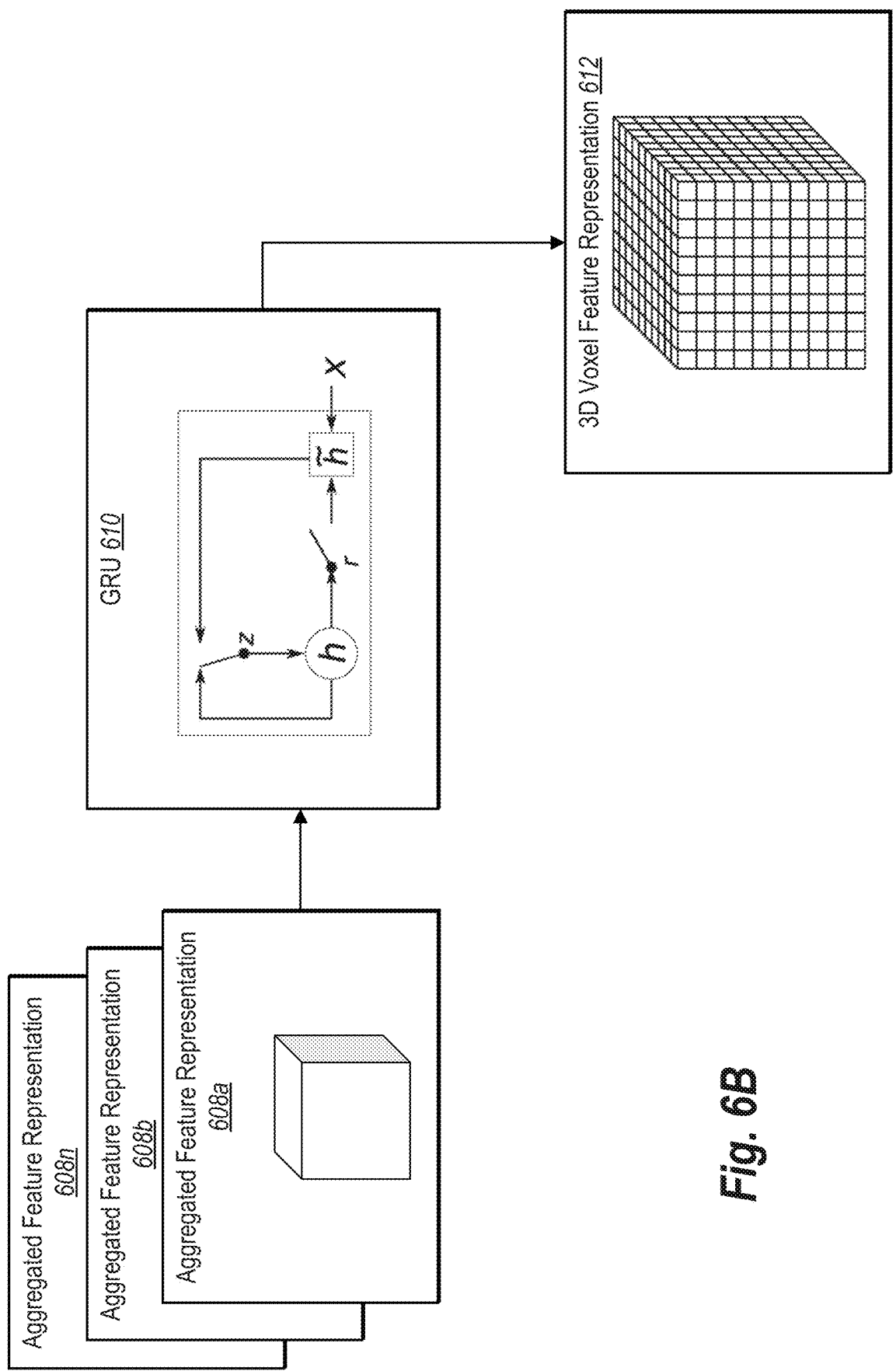

Then, the novel-view synthesis system 106 can fuse multiple aggregated feature representations (generated using pooling) by utilizing a GRU to generate a 3D voxel feature representation that represents an object as a 3D object. For example, FIG. 6B illustrates the novel-view synthesis system 106 utilizing a GRU to fuse multiple aggregated feature representations. Indeed, as shown in FIG. 6B, the novel-view synthesis system 106 can input the aggregated feature representations 608a-608n into the GRU 610 (e.g., a 3D GRU) to fuse the aggregated feature representations 608a-608n. As further illustrated in FIG. 6B, the GRU 610 can fuse the aggregated feature representations 608a-608n to output a 3D voxel feature representation 612.

Indeed, the lifted and transformed feature representations $\overline{X}_i$ (as described above) provide single-view observations of an object at a camera pose $g_i$. The novel-view synthesis system 106 learns a holistic 3D voxel representation $Z \in \mathbb{R}^{c \times s \times s \times s}$ by integrating the transformed feature representations into a voxel representation. Although, as described above, conventional systems often sequentially integrate features extracted from different images of an object from different viewpoints and this often introduces inaccuracies such as viewpoint biases and convergence problems. In order to reduce viewpoint biases and improve convergence to generate a more accurate 3D voxel representation for an object the novel-view synthesis system 106 aggregates the transformed feature representations $\overline{X}_i$ from V different viewpoints via both recurrent gated-fusion and concurrent pooling within each iteration (e.g., k iterations) of voxel representation updates (e.g., as illustrated by FIGS. 6A and 6B).

For instance, in one or more embodiments, the novel-view synthesis system 106 utilizes a pooling operation to transformed feature representations of a subset of viewpoints using max-pooling. For instance, the novel-view synthesis system 106 can generate an aggregated feature representation $Z^K = \text{Max}(Z_1^k, Z_2^k, \ldots, Z_V^k)$ for a subset of viewpoints V in each iteration (1 through k). In some embodiments, the novel-view synthesis system 106 applies a max-pooling operation along the first dimension (e.g., a feature channel) of input deep voxel tensors $Z_j^k \in \mathbb{R}^{c \times s \times s \times s}$. Although one or more embodiments illustrate the novel-view synthesis system 106 utilizing max-pooling, the novel-view synthesis system 106 can utilize other pooling operations such as mean-pooling.

Then, the novel-view synthesis system 106 can fuse an aggregated feature representation obtained from single view transformation feature representations $\overline{X}_j^k$ belonging to a subset of viewpoints V (e.g., $Z^k$ as described above) into a holistic 3D voxel feature representation $Z^{k-1}$ that is learned from a previous iteration: $Z_j^k = \text{GRU}(Z^k, Z^{k-1})$. Indeed, the novel-view synthesis system 106 models the 3D voxel feature representation Z as a hidden embedding of a 3D-GRU and recurrently updates when more aggregated feature representations (pooled from multiple views) are received. In addition, for a first round of voxel representation aggregation, the novel-view synthesis system 106 can initialize $Z^0$ with zero values. Indeed, as mentioned above, the novel-view synthesis system 106 can leverage pooled transformed feature representations from subsets of viewpoints to recurrently update a 3D voxel feature representation output by a 3D-GRU rather than sequentially providing single-view observations at each iteration. This results in a 3D voxel feature representation with less viewpoint biases that is capable of providing larger surface coverage of the object and, thereby, also stabilizes a recurrent training process for the novel-view synthesis encoder/decoder architecture.

As mentioned above, the novel-view synthesis system 106 can render a 2D view using view-dependent frustum feature sufficient sampling and patch-based rendering. For instance, in order to render a 2D view of a target image at a given pose (or viewpoint) from the 3D voxel feature representation, the novel-view synthesis system 106 utilizes view-dependent frustum feature sampling, dimensionality reduction of the sampled frustum feature sample, and patch-based neural rendering from the sampled frustum feature sample. Indeed, the novel-view synthesis system 106 can utilize view-dependent frustum feature sampling and patch-based rendering on a 3D voxel feature representation to display a variety of views (e.g., via a client device) to depict the object initially depicted in input images from a novel view.

Figure 7:
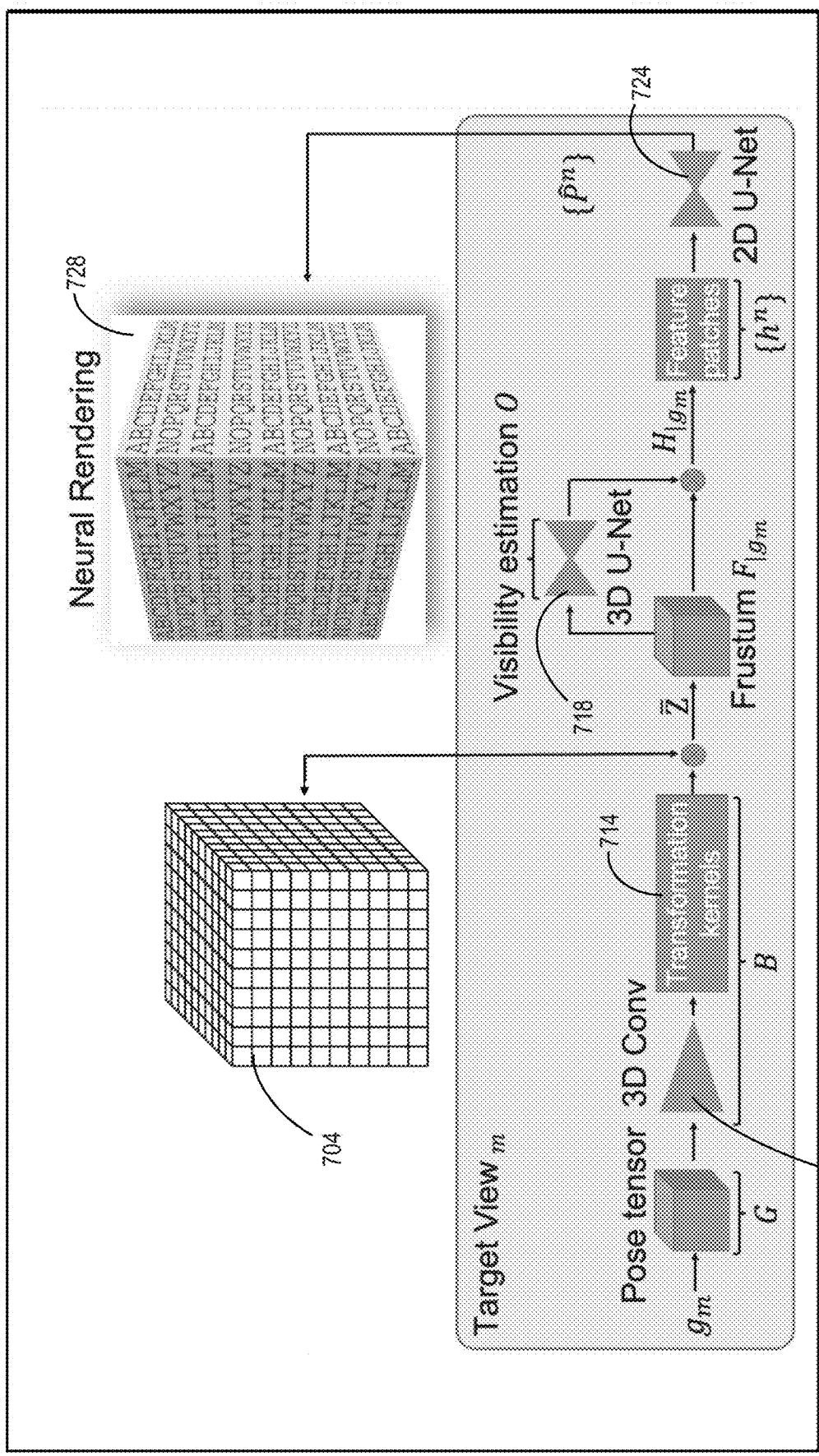
FIG. 7 illustrates a novel-view synthesis system rendering a view of an object using sufficient frustum sampling and patch-based rendering in accordance with one or more embodiments.

For instance, FIG. 7 illustrates the novel-view synthesis system 106 utilizing view-dependent frustum feature sampling, dimensionality reduction, and patch-based neural rendering within the novel-view synthesis encoder/decoder architecture. In particular, as shown in FIG. 7, the novel-view synthesis system 106 can utilize a 3D voxel feature representation 704 determined using concurrent-recurrent voxel aggregation (as described above) to render views of an object. Furthermore, the novel-view synthesis system 106 can input the 3D voxel feature representation 704 into a 3D U-Net to further complete a representation of the 3D voxel feature representation 704 (e.g., prior to using the 3D voxel feature representation for projection).

Moreover, as shown in FIG. 7, the novel-view synthesis system 106 learns transformation kernel 714. In particular, as illustrated in FIG. 7, the novel-view synthesis system 106 first inputs a target viewpoint pose $g_m$ into a pose tensor G. Then, as shown in FIG. 7, the novel-view synthesis system 106 utilizes one or more 3D convolution layers 712 to learn transformation kernels 714 from the pose tensor G. In addition, as shown in FIG. 7, the novel-view synthesis system 106 projects the transformation kernels 714 onto the 3D voxel feature representation 704 (or a completed 3D voxel representation obtained from a 3D U-Net) to obtain a view-dependent transformed voxel feature $\overline{Z}$. Further, as shown in FIG. 7, the novel-view synthesis system 106 samples a frustum feature $F_{|g_m}$ from the transformed voxel feature $\overline{Z}$.

Indeed, in one or more embodiments, for each target camera pose $g_m$, the novel-view synthesis system 106 defines a d×h×w frustum space to enclose the s×s×s cubic voxels where the 3D voxel feature representation Z exists. For instance, a frustum feature can include a multilayer depth map in the camera coordinates of $g_m$. In particular, the novel-view synthesis system 106 can map one or more depth pixels within the frustum feature into the voxel space (e.g., of the 3D voxel feature representation) by inverse-perspective projection and sample a transformed voxel feature $\overline{Z} \in \mathbb{R}^{c \times s \times s \times s}$ by utilizing differentiable bi-linear interpolation (or differentiable tri-linear interpolation) (e.g., with a learned transformation kernel and the 3D voxel feature representation). For instance, the novel-view synthesis system 106 can sample the transformed voxel feature $\overline{Z}$ using the following equation:

$$\overline{Z} = B(G(g_m)) \otimes Y(Z).$$

For example, the novel-view synthesis system 106 utilizes Y(•) as a 3D U-Net (e.g., 3D U-Net 706) to complete the object representation of Z (e.g., the 3D voxel feature representation 704). Furthermore, the novel-view synthesis system 106 can model view-dependency in the rendering phase for observing voxel features at different camera poses. In particular, the novel-view synthesis system 106 utilizes a mapping function B(•) that utilizes a voxel-camera pose tensor G ($g_m$) as input and estimates feature transformation kernels (e.g., transformation kernels 714). Indeed, novel-view synthesis system 106 implements the mapping function B(•) as one or more 3D convolution layers (e.g., 3D convolution layers 712). As described above, the novel-view synthesis system 106 can rectify a camera intrinsic matrix when performing inverse-perspective projection (to obtain transformation kernels). In particular, the novel-view synthesis system 106 utilizes scaling factors (α, β) as (width, height) ratios between the defined d×h×w frustum space and a rendered target image (e.g., $T_{|g_m}$ or 2D view 726). Indeed, the novel-view synthesis system 106 can sample frustum features as $F_{|g_m} \in \mathbb{R}^{c \times d \times h \times w}$ (e.g., from the transformed voxel feature $\overline{Z}$).

In addition, as illustrated in FIG. 7, the novel-view synthesis system 106 reduces the dimensionality of the frustum feature $F_{|g_m}$ by utilizing a 3D U-Net 718 (e.g., to obtain a visibility estimation) to generate a lower-dimension frustum feature $H_{|g_m}$. For instance, in some embodiments, the novel-view synthesis system 106 reduces the dimensionality of a sampled frustum feature to collapse 3D information corresponding to the frustum feature into a 2D representation. For example, the novel-view synthesis system 106 can reduce the dimensionality of a frustum feature by collapsing (or reducing) a depth dimension corresponding to the frustum feature.

In particular, the novel-view synthesis system 106 can reduce the dimensionality of a frustum feature representation ($F_{|g_m}$) by first collapsing the frustum feature representation into depth dimension reduced frustum features (e.g., lower-dimension frustum features) $H_{|g_m} \in \mathbb{R}^{c \times h \times w}$. For instance, the novel-view synthesis system 106 can utilize weighted average feature pooling upon the depth dimension of a frustum feature representation to reduce the frustum feature representation ($F_{|g_m}$) into lower dimension frustum features $H_{|g_m}$. Indeed, the novel-view synthesis system 106 can reduce the depth dimension of a frustum feature to estimate frustum feature visibility reasoning (e.g., for better patch rendering from the frustum feature because the frustum feature is a deep multi-plane representation of the object).

Indeed, the novel-view synthesis system 106 can reduce the frustum feature representation ($F_{|g_m}$) into lower dimension frustum features $H_{|g_m}$ using the following algorithm:

$$H_{|g_m} = \text{Avg}[F_{|g_m} \otimes O(F_{|g_m})]_{|dim=1}$$

in which $\text{Avg}[\bullet]_{|dim=1}$ indicates weighted average feature pooling along the second dimension (e.g., depth) of the c×d×h×w input tensor (e.g., the frustum feature representation $F_{|g_m}$). Furthermore, in reference to the above equation, the novel-view synthesis system 106 utilizes ⊗ as an element-wise multiplication with the first dimension broadcasting between $F_{|g_m} \in \mathbb{R}^{c \times d \times h \times w}$ and $O(\bullet) \in \mathbb{R}^{1 \times d \times h \times w}$.

In particular, the novel-view synthesis system 106 implements $O(\bullet) \in \mathbb{R}^{1 \times d \times h \times w}$ as a 3D U-Net with skip connections (e.g., 3D U-Net 718) that outputs a frustum visibility estimation corresponding to a target viewpoint gm (e.g., target viewpoint camera pose 708) to add interpretability in the view rendering process. In one or more embodiments, the novel-view synthesis system 106 utilizes the frustum visibility estimation to compute pseudo-depth maps which explain several rendering artifacts, which in turn enables the novel-view synthesis system 106 to reduce empty spaces and/or other artifacts such as aliasing and holes in novel views compared to conventional graphics systems.

Subsequently, as shown in FIG. 7, the novel-view synthesis system 106 samples frustum feature patches $\{h^n\}$ from the lower-dimension frustum feature $H_{|g_m}$ (e.g., as 2D feature patches). For instance, as described above, the novel-view synthesis system 106 can sample frustum feature patches similarly to sampling image patches (e.g., in FIG. 4). In particular, the novel-view synthesis system 106 can divide the lower-dimension frustum feature (e.g., $\{h^n\}$) into frustum feature patches (e.g., $\{h^n\}_{n=1}^N$) by utilizing a sliding window approach (with overlaps) along the width and height of the lower-dimension frustum feature. Indeed, the novel-view synthesis system 106 can utilize a stochastic, heuristic, or random sampling strategy to sample frustum feature patches as described above in regard to sampling image patches. Furthermore, as previously mentioned, by sampling frustum feature patches, the novel-view synthesis system 106 can utilize fewer 2D U-Net parameters, reduce the complexity of large image context modeling, and model or render images at arbitrarily large resolutions from a frustum feature (for greater detail).

Then, as shown in FIG. 7, the novel-view synthesis system 106 utilizes a 2D U-Net 724 on the frustum feature patches $\{h^n\}$ to render image patches $\{\hat{P}^n\}$. Indeed, the novel-view synthesis system 106 can blend the rendered image patches $\{\hat{P}^n\}$ to render a 2D view 728 of the object from the target viewpoint (e.g., as a 3D model). For instance, the novel-view synthesis system 106 utilizes a 2D U-Net to conduct patch neural rendering: $h^n \mapsto \hat{P}^n$. Furthermore, the novel-view synthesis system 106 can blend (or composite) all N rendered patches $\{\overline{P}^n\}_{n=1}^N$ into a target image raster. Furthermore, the novel-view synthesis system 106 can crop overlapped regions of the composited patches $\{\hat{P}^n\}_{n=1}^N$ to reduce seam artifacts. Indeed, the novel-view synthesis system 106 can display the composited (stitched) patches $\{\hat{P}^n\}_{n=1}^N$ as a rendered 2D view of the object (e.g., $\hat{T}_{1g_m}$).

Indeed, utilizing the novel-view synthesis encoder/decoder architecture as described above, the novel-view synthesis system 106 can render 2D views from a variety of target viewpoints of an object. As such, the novel-view synthesis system 106 can represent an object as a 3D object by smoothly interpolating between viewpoints of the object using rendered 2D views from the various target viewpoints. Indeed, the novel-view synthesis system 106 can display a rendered view of the object as a 3D object and, upon receiving a target viewpoint from a client device, the novel-view synthesis system 106 can update the rendered view to display the object from the target viewpoint.

Figure 8:
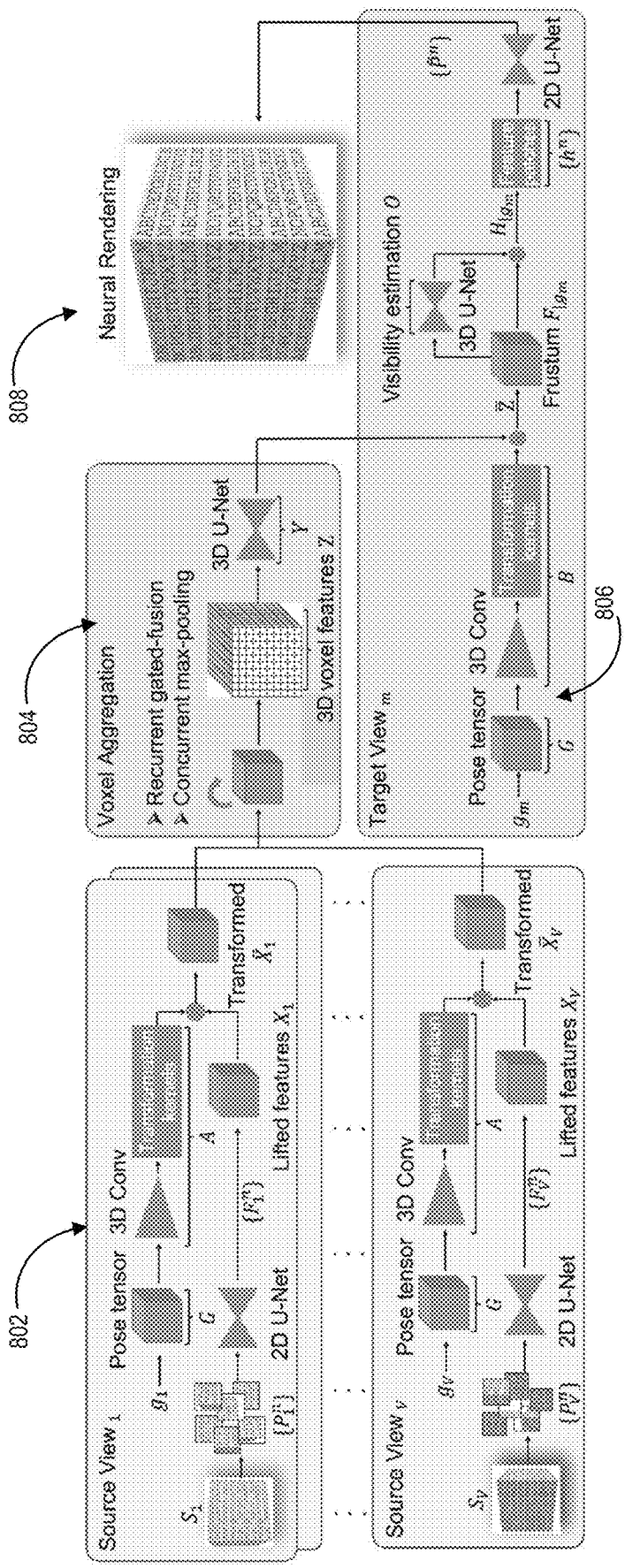
FIG. 8 illustrates a novel-view synthesis encoder/decoder architecture in accordance with one or more embodiments.

The novel-view synthesis system 106 utilizes a novel-view synthesis encoder-decoder architecture to learn a volumetric 3D representation of an object using digital images of the object from multiple viewpoints to render novel views of the object as described by FIGS. 4-7. Indeed, FIG. 8 illustrates the novel-view synthesis encoder-decoder architecture utilized by the novel-view synthesis system 106. Specifically, FIG. 8 illustrates the novel-view synthesis system 106 sampling image patches from images and generating view-dependent transformed feature representations from the image patches in a first phase 802 or encoder. Then, FIG. 8 illustrates the novel-view synthesis system 106 generating a 3D voxel feature representation using concurrent-recurrent aggregation of the transformed feature representations in the second phase 804 or bottleneck. Furthermore, as shown in FIG. 8, the novel-view synthesis system 106 renders a 2D view 808 (e.g., a novel view) of the object using the 3D voxel feature representation via view-dependent frustum sampling and patch-based neural rendering in the third phase 806 or decoder.

In addition, the description above describes the novel-view synthesis system 106 utilizing the novel-view synthesis encoder-decoder architecture in an inference stage (e.g., post training). In some embodiments, the novel-view synthesis system 106 can also train the novel-view synthesis encoder-decoder architecture. Indeed, the novel-view synthesis system 106 trains the novel-view synthesis encoder-decoder architecture using a total loss for the entire pipeline of the architecture (e.g., trained jointly). Furthermore, the novel-view synthesis system 106 trains the novel-view synthesis encoder-decoder architecture without a supervised 3D model by using a 2D loss function (e.g., an image reconstruction loss).

For example, the novel-view synthesis system 106 can utilize training data of an object that consists of M multi-view images $\{I_i, g_i\}_{i=1}^M$ in which $I_i: D \subset \mathbb{R}^2$ is a digital image captured at a pose $g_i \in \mathbb{R}^{4 \times 4}$ (e.g., computed using structure-from-motion). During a training phase, the novel-view synthesis system 106 can sample multi-view images into tuples of $\{S_i, T_i^0, T_i^1\}_{i=1}^M$ in which $S_i$ represents source images and $T_i$ represents rendered images. During each training step, the novel-view synthesis system 106 can update the networks of the novel-view synthesis encoder-decoder architecture using an $L^1$ reconstruction loss upon predicted target views (e.g., rendered views) $\{(\hat{T}_j^0, \hat{T}_j^1)\}_{j=1}^V$ while accepting multiple source images $\{S_j\}_{j=1}^V$ as input, to improve the accuracy and optimize the novel-view synthesis encoder-decoder architecture (e.g., using back-propagation).

For instance, the novel-view synthesis system 106 can determine an $L^1$ reconstruction loss by utilizing rendered image patches (in accordance with one or more embodiments) and ground truth image patches from multiple source images $\{S_j\}_{j=1}^V$. In particular, the novel-view synthesis system 106 can determine an $L^1$ reconstruction loss for the whole network (e.g., encoder, bottleneck (3D-GRU and max-pooling), decoder) utilizing the following $L^1$ reconstruction loss function:

$$L(\hat{P}^n, P^n) = \lambda * \frac{\sum_{n=1}^{N'} \sum_{a,b} \|\hat{P}_{a,b}^n - P_{a,b}^n\|_1}{N' * D}$$

in which $\lambda$ represents a weight, $\hat{P}^n$ represents a rendered image patch, and $P^n$ represents a ground-truth patch. Furthermore, in reference to the above $L^1$ reconstruction loss equation, (a, b) represent pixel indices within an image patch and D represents the pixel number of an image patch.

As mentioned above, the novel-view synthesis system 106 can quickly and accurately synthesizes novel views for an object based on a 3D voxel feature representation. For instance, experimenters utilized the novel-view synthesis encoder-decoder architecture in accordance with one or more embodiments to compare results with DeepVoxels referred to hereinbelow as the current state of the art (SAT). Indeed, the novel-view synthesis encoder-decoder architecture in accordance with one or more embodiments, rendered more accurate 3D models with smoother interpolations compared to other methods. For instance, the following Table 1 demonstrates Peak Signal-to-noise Ratio (PSNR) and Structural Similarity Index (SSIM) values on outputs from the DeepVoxels method and the novel-view synthesis encoder-decoder architecture in accordance with one or more embodiments of the present disclosure. For fairness of comparison, the experimenters used the same dataset and evaluation SSIM and PSNR as DeepVoxels. As shown by Table 1, the novel-view synthesis encoder-decoder architecture PSNR and SSIM values indicate an improvement in accuracy compared to the current state of the art. In particular, Table 1 shows implementations of the present disclosure outperform the current state of the art by 22% PSNR improvement and 33% SSIM error reduction.

TABLE 1

| Method | Vase PSNR/SSIM | Chair PSNR/SSIM | Cube PSNR/SSIM |
|---|---|---|---|
| SAT | 27.99/0.96 | 33.45/0.99 | 28.42/0.97 |
| Novel-view Synthesis System | 32.91/0.98 | 40.87/0.99 | 36.51/0.99 |

Not only do implementations of the novel-view synthesis system 106 provide increased accuracy of the current state of the art, implementations of the novel-view synthesis system 106 can do so with reduced training times and data. As such, implementations of the novel-view synthesis system 106 provide technical improvements to computing devices by reducing the amount of storage, processing power, and processing time to perform novel-view synthesis.

For example, the current state of the art requires a large number of multi-view images (e.g. around 500) to learn a faithful deep representation of an object. Implementations of the novel-view synthesis system 106 can learn to produce high-fidelity output even with a limited number of views. For example, the experimenters utilized full-size, ⅓, ¹⁄₁₆ and ¹⁄₄₈ of the DeepVoxels training data. The results in PSNR are shown in Table 2 below. Implementations of the novel-view synthesis system 106 outperforms the current state of the art in all conditions. Indeed, as shown by Table 2, implementations of the novel-view synthesis system 106 trained on ⅓ of the dataset outperform the current state of the art trained on the full training data. As such, implementations of the novel-view synthesis system 106 demonstrate promising results for real-world applications where only few images are available for 3D object representation learning. For example, camera rig based image capture systems.

TABLE 2

| Method | Full Data PSNR | ⅓ Data PSNR | ¹⁄₁₆ Data PSNR | ¹⁄₄₈ Data PSNR |
|---|---|---|---|---|
| SAT | 30.55 | 28.09 | 26.06 | 19.35 |
| Novel-view Synthesis System | 37.31 | 33.34 | 27.87 | 20.71 |

The results from Tables 1 and 2 were generated utilizing all four of the technical advances described above in relation to FIG. 3. As discussed above, however, each individual technical advancement (e.g., low-complexity patch modeling, view-dependent voxel feature transformation, concurrent-recurrent voxel feature aggregation, and frustum representation sufficient sampling) individually provides benefits and technological improvements over the current state of the art.

In particular, Table 3 below illustrates the increase in accuracy of using patch modeling versus full-image modeling in PSNR. In addition to the increase in accuracy, the patch-based pipeline reduces the image context modeling complexity, halves U-Net parameters used in feature extraction and neural rendering as shown by Table 3, and provides an extensible framework for applying patch sampling techniques in order to let the network focus more on rich-texture regions.

TABLE 3

| Context Modeling Scale | Chair PSNR | Cube PSNR | Parameters in millions for Feature Extraction | Parameters in millions for Neural Rendering |
|---|---|---|---|---|
| Full-Image | 38.73 | 35.35 | 92.2 | 108.9 |
| Patch | 40.43 | 36.27 | 40.3 | 56.9 |

Table 4 below illustrates comparisons between results without and with feature transformation kernels based voxel view-dependency modeling utilizing the novel-view synthesis system 106. The experimenters used 30 training images for each object. As shown, the explicit view-dependency modeling is most effective when objects have fine-scale geometry (e.g., pedestal, chair) and limited training views. In any event, Table 4 demonstrates how the use of view-dependent voxel feature transformation can increase accuracy.

TABLE 4

| Method | Pedestal PSNR | Chair PSNR | Cube PSNR |
|---|---|---|---|
| Without View-Dependent Transformation | 29.84 | 28.89 | 25.19 |
| With View-Dependent Transformation | 30.83 | 29.45 | 25.43 |

With reference to concurrent-recurrent voxel feature aggregation, the results shown in Table 5 indicate concurrent-recurrent voxel representation aggregation of 4 views and 8 views can lead to better visual quality for novel-view rendering and significantly reduced training time when compared to no aggregation (e.g., 1 view). Table 5 further establishes that concurrent-recurrent voxel representation aggregation is most effective when view number increases from 1 to 4 and starts to become less effective when at 8 views. Thus, in the benchmark results shown provided herein, the experimenters used 4 views considering the trade-off between performance gains and GPU size constraints.

TABLE 5

| Views | Vase PSNR | Pedestal PSNR | Chair PSNR | Cube PSNR | Training Time Hours |
|---|---|---|---|---|---|
| 1 | 29.84 | 32.35 | 33.45 | 28.42 | ~71 |
| 4 | 30.30 | 34.64 | 35.97 | 31.97 | ~24 |
| 8 | 29.45 | 35.54 | 37.79 | 31.65 | ~19 |

Table 6 illustrates the improvements of frustum representation sufficient sampling. The state of the art uses 32×32 sampling sizes due to GPU memory constraints. As such by Table 6, sufficient frustum sampling from the deep voxel features can substantially improve the visual quality of the rendering with sharper details than the current state of the art. The frustum representation sampling sizes are determined by height/width of the depth dimension reduced frustum feature maps. For the benchmark results shown provided herein, the experimenters used 128×128 sampling. The modification of the frustum structure addresses a sampling challenge of the voxel-to-frustum feature projection procedure. One explanation is that though voxels have low spatial resolution, they contain high dimensional deep features, encoding both of an object's texture and shape information. Therefore the differentiable tri-linear interpolation based frustum sufficient sampling process enforces strong supervision on the deep voxel features, and eventually helps to encode more fine-scale details into the learned 3D voxel feature representation.

TABLE 6

| Sampling Sizes h × w | Vase PSNR | Pedestal PSNR | Chair PSNR | Cube PSNR |
| --- | --- | --- | --- | --- |
| 32 × 32 (SAT) | 29.84 | 32.35 | 33.45 | 28.42 |
| 64 × 64 | 30.30 | 34.64 | 35.97 | 31.97 |
| 128 × 128 | 29.45 | 35.54 | 37.79 | 31.65 |

Figure 9:
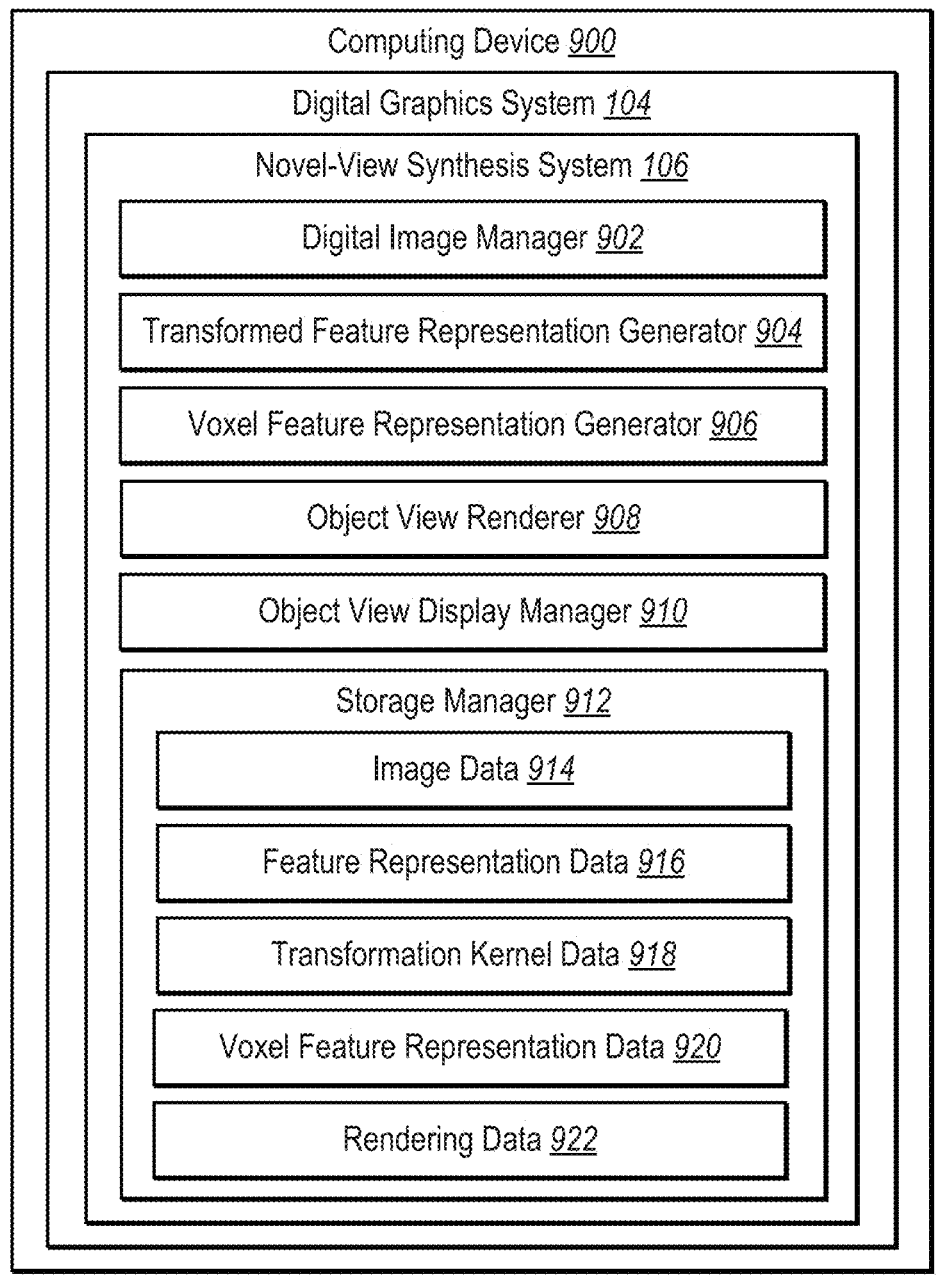
FIG. 9 illustrates a schematic diagram of a novel-view synthesis system in accordance with one or more embodiments.

Turning now to FIG. 9, additional detail will be provided regarding components and capabilities of one or more embodiments of the novel-view synthesis system. In particular, FIG. 9 illustrates an embodiment of an example novel-view synthesis system 106 executed by a computing device 900 (e.g., the server device(s) 102). As shown by the embodiment of FIG. 9, the computing device 900 can include or host the digital graphics system 104 and the novel-view synthesis system 106. The novel-view synthesis system 106 can include a digital image manager 902, a transformed feature representation generator 904, a voxel feature representation generator 906, an object view renderer 908, an object view display manager 910, and a storage manager 912 which can include image data 914, feature representation data 916, transformation kernel data 918, voxel feature representation data 920, and rendering data 922.

As just mentioned, and as illustrated in the embodiment of FIG. 9, the novel-view synthesis system 106 can include the digital image manager 902. For example, the digital image manager 902 can receive and/or obtain a plurality of digital images depicting an object from various viewpoints as described above (e.g., in relation to FIG. 2). Furthermore, the digital image manager 902 can sample image patches from digital images of the plurality of digital images as described above (e.g., in relation to FIG. 4). In addition, the digital image manager 902 can determine camera pose information for the digital images of the plurality of digital images as described above (e.g., in relation to FIG. 5).

Moreover, as shown in FIG. 9, the novel-view synthesis system 106 can include the transformed feature representation generator 904. For instance, the transformed feature representation generator 904 can extract feature representations from digital image patches (or digital images) for one or more viewpoints as described above (e.g., in relation to FIG. 5). Additionally, the transformed feature representation generator 904 can learn transformation kernels from camera pose information corresponding to images as described above (e.g., in relation to FIG. 5). In addition, the transformed feature representation generator 904 can generate a transformed feature representation for a particular viewpoint of an object by applying transformation kernels to feature representations as described above (e.g., in relation to FIGS. 5A and 5B).

Furthermore, as shown in FIG. 9, the novel-view synthesis system 106 can include the voxel feature representation generator 906. For instance, the voxel feature representation generator 906 can generate a plurality of aggregated feature representations by pooling feature representations belonging to subsets of viewpoints (e.g., concurrently pooling) as described above (e.g., in relation to FIG. 6A). Moreover, the voxel feature representation generator 906 can generate a three-dimensional voxel feature representation by fusing a plurality of aggregated feature representations (e.g., recurrently fusing the pooled feature representations) as described above (e.g., in relation to FIG. 6B).

In addition, as shown in FIG. 9, the novel-view synthesis system 106 can include the object view renderer 908. For example, the object view renderer 908 can sample view-dependent frustum feature samples from a 3D voxel feature representation using transformation kernels as described above (e.g., in relation to FIG. 7). Moreover, the object view renderer 908 can utilize patch-based neural rendering of the sampled frustum features to render views of a 3D object represented by the 3D voxel feature representation as described above (e.g., in relation to FIG. 7).

Furthermore, as shown in FIG. 9, the novel-view synthesis system 106 can include the object view display manager 910. For instance, the object view display manager 910 can display views of an object that are rendered using the novel-view synthesis encoder/decoder architecture as described above (e.g., in relation to FIGS. 2 and 7). In addition, the object view display manager 910 can update a displayed view of an object according to a selected viewpoint to represent the object as a 3D object as described above (e.g., in relation to FIGS. 2 and 7).

Additionally, as shown in FIG. 9, the novel-view synthesis system 106 can include the storage manager 912. In some embodiments, the storage manager 912 can be implemented by one or more memory devices. The storage manager 912 can maintain data to perform one or more functions of the novel-view synthesis system 106. As shown in FIG. 9, the storage manager 912 can include the image data 914 (e.g., digital images, digital image patches, camera pose information, viewpoint information), the feature representation data 916 (e.g., lifted feature representations, transformed feature representations, feature map data), the transformation kernel data 918 (e.g., camera pose tensor information, 3D convolution layers, transformation kernels), the voxel feature representation data 920 (e.g., 3D voxel feature representations, GRU, aggregated feature representations, 3D U-Net data), and rendering data 922 (e.g., 2D views, frustum features, frustum feature patches, neural renderer data).

Each of the components 902-922 of the computing device 900 (e.g., the computing device 900 implementing the novel-view synthesis system 106), as shown in FIG. 9, may be in communication with one another using any suitable technology. The components 902-922 of the computing device 900 can comprise software, hardware, or both. For example, the components 902-922 can comprise one or more instructions stored on a computer-readable storage medium and executable by processor of one or more computing devices. When executed by the one or more processors, the computer-executable instructions of the novel-view synthesis system 106 (e.g., via the computing device 900) can cause a client device and/or server device to perform the methods described herein. Alternatively, the components 902-922 and their corresponding elements can comprise hardware, such as a special purpose processing device to perform a certain function or group of functions. Additionally, the components 902-922 can comprise a combination of computer-executable instructions and hardware.

Furthermore, the components 902-922 of the novel-view synthesis system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-922 may be implemented as a stand-alone application, such as a desktop or mobile application. Furthermore, the components 902-922 may be implemented as one or more web-based applications hosted on a remote server. The components 902-922 may also be implemented in a suite of mobile device applications or "apps." To illustrate, the components 902-922 may be implemented in an application, including but not limited to, ADOBE PHOTOSHOP, ADOBE ILLUSTRATOR, or ADOBE SUBSTANCE. "ADOBE," "ADOBE PHOTOSHOP," "ADOBE ILLUSTRATOR," or "ADOBE SUBSTANCE" are either registered trademarks or trademarks of Adobe Inc. in the United States and/or other countries.

Figure 10:
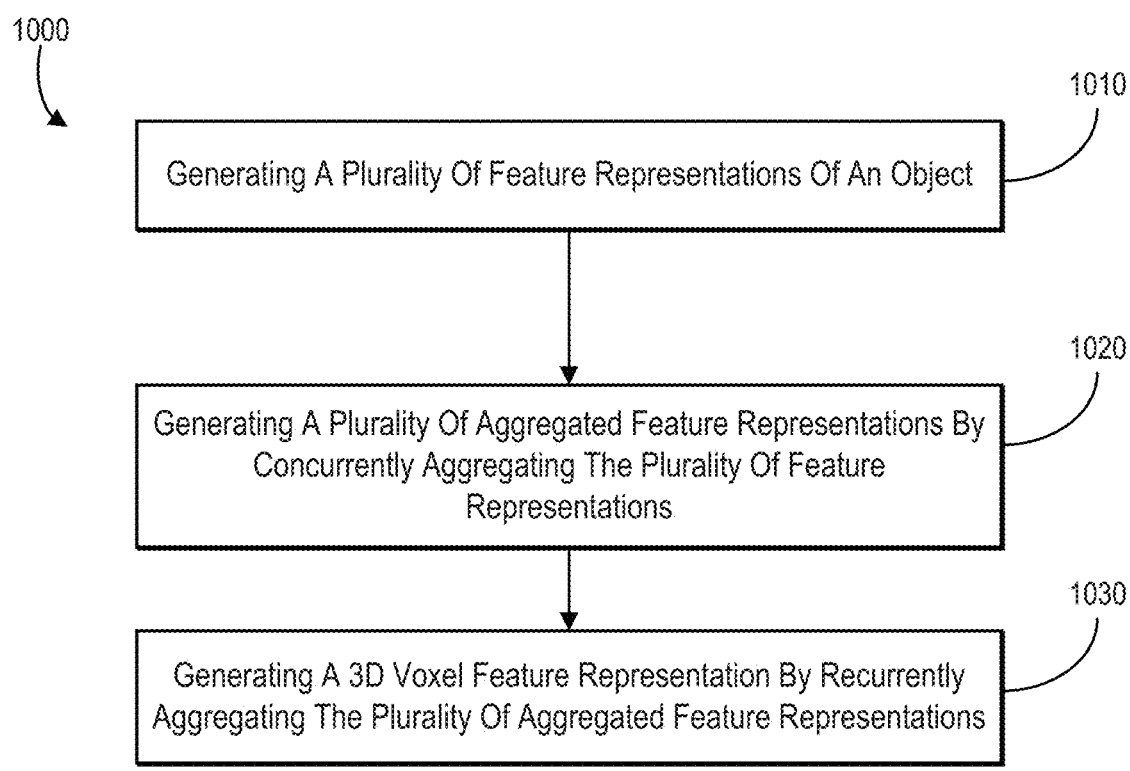
FIG. 10 illustrates a flowchart of a series of acts for generating a three-dimensional voxel feature representation of an object that enables rendering a novel-view of the object in accordance with one or more embodiments.
Figure 11:
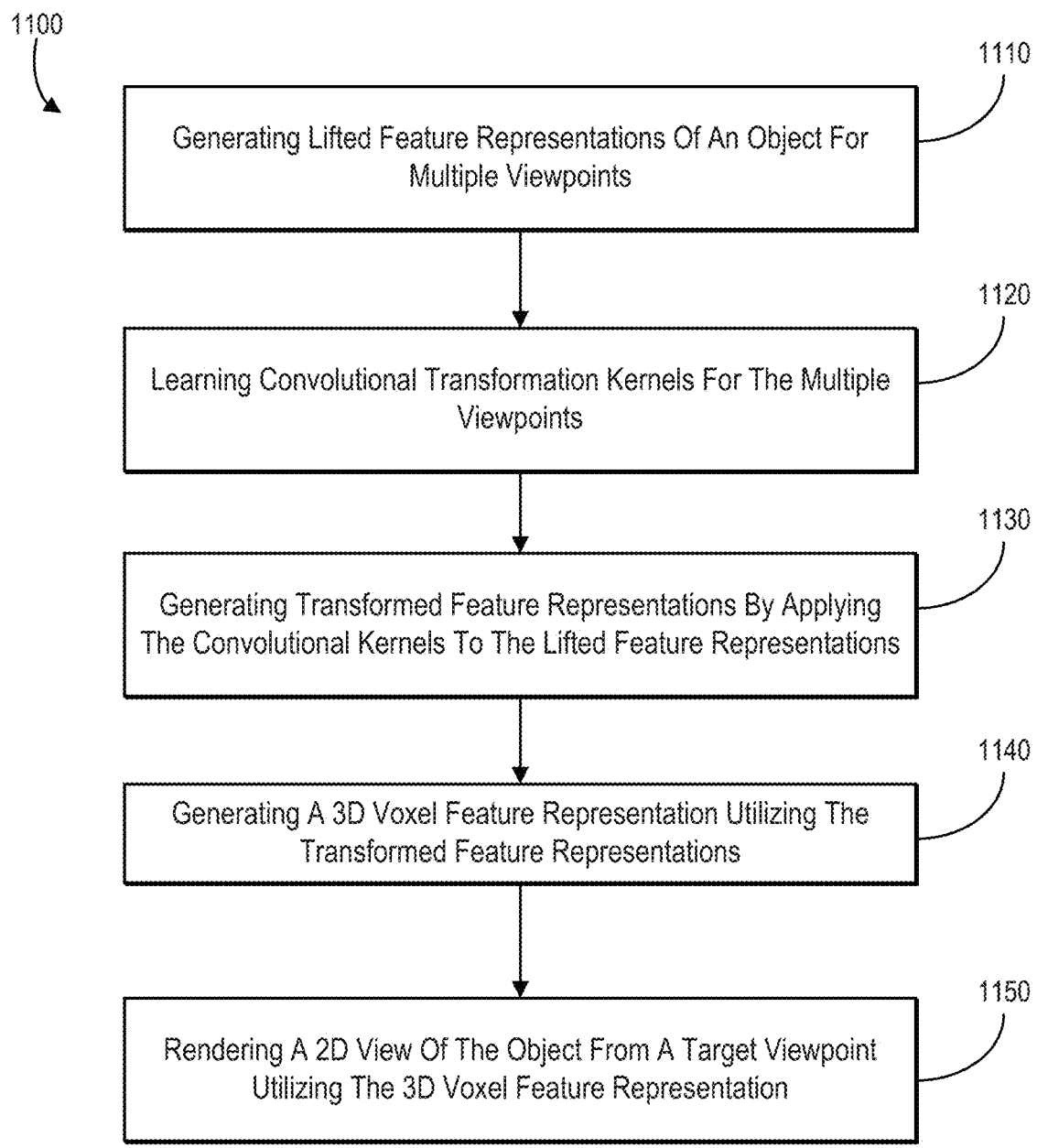
FIG. 11 illustrates a flowchart of a series of acts 1100 for rendering a novel-view from a plurality of digital images in accordance with one or more embodiments.
Figure 12:
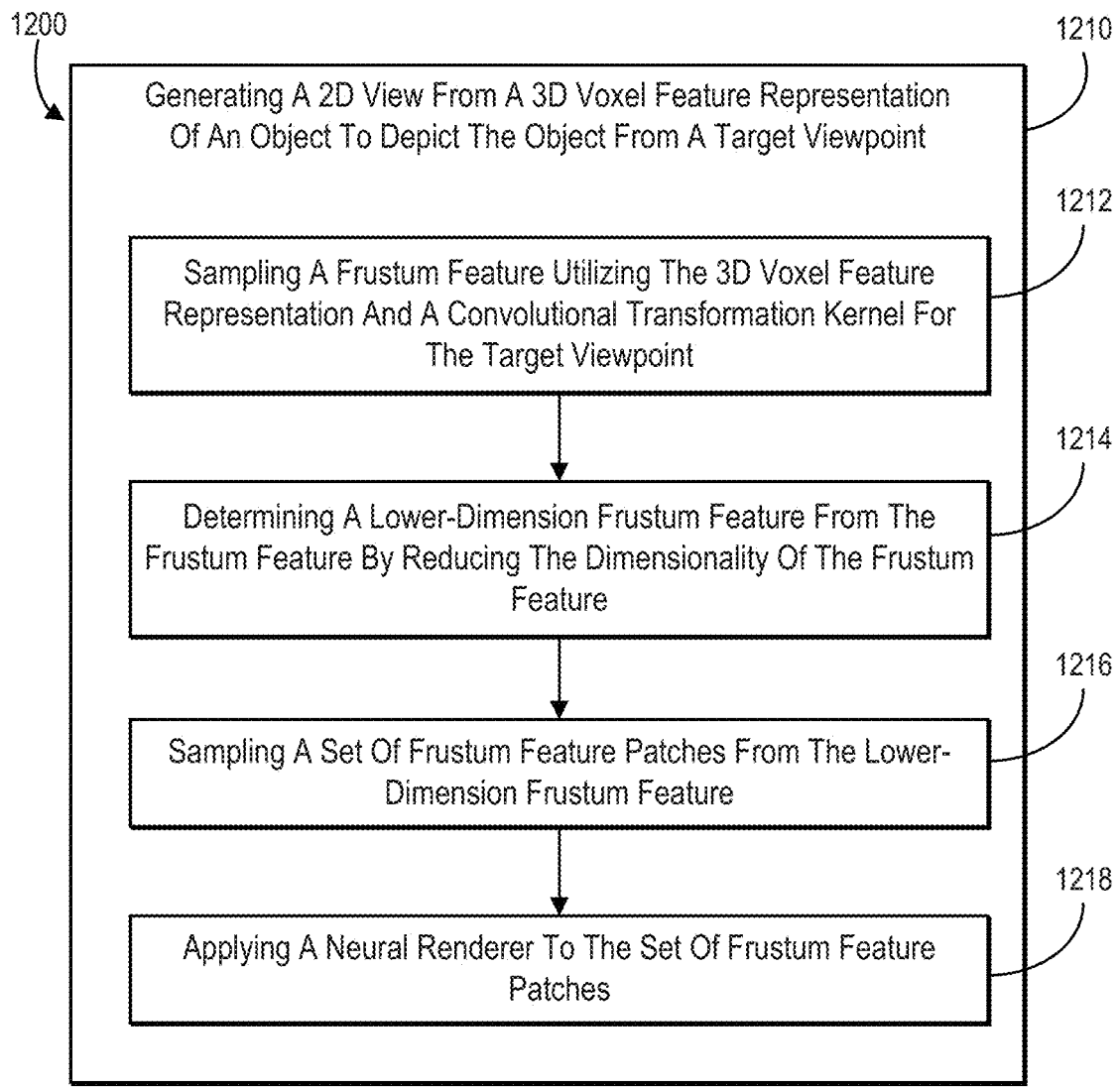
FIG. 12 illustrates a flowchart of a series of acts 1200 for rendering a novel-view from a plurality of digital images in accordance with one or more embodiments.

FIGS. 1-9, the corresponding text, and the examples provide a number of different methods, systems, devices, and non-transitory computer-readable media of the novel-view synthesis system 106. In addition to the foregoing, one or more embodiments can also be described in terms of flowcharts comprising acts for accomplishing a particular result, as shown in FIGS. 10-12. The acts shown in FIGS. 10-12 may be performed in connection with more or fewer acts. Further, the acts may be performed in differing orders. Additionally, the acts described herein may be repeated or performed in parallel with one another or parallel with different instances of the same or similar acts. The acts of FIGS. 10-12 can be performed as part of a method (e.g., in a digital medium environment of computational graphics). Alternatively, a non-transitory computer-readable medium can comprise instructions that, when executed by one or more processors, cause a computing device to perform the acts of FIGS. 10-12. In some embodiments, a system can be configured to perform the acts of FIGS. 10-12.

As mentioned above, FIG. 10 illustrates a flowchart of a series of acts 1000 for generating a three-dimensional voxel feature representation of an object that enables rendering a novel-view of the object in accordance with one or more embodiments. While FIG. 10 illustrates acts according to one embodiment, alternative embodiments may omit, add to, reorder, and/or modify any of the acts shown in FIG. 10.

As shown in FIG. 10, the series of acts 1000 include an act 1010 of generating a plurality of feature representations of an object, where each feature representation corresponds to one of multiple viewpoints. In particular, the act 1010 can include extracting feature maps from digital images of a plurality of digital images depicting an object from the multiple viewpoints. More particularly, act 1010 can involve extracting the feature maps utilizing a 2D U-Net. Furthermore, the act 1010 can include lifting features from the feature maps. Act 1010 can involve lifting features from the feature maps utilizing camera pose information for the digital image from which the feature map was extracted. Each feature representation from the plurality of feature representations can correspond to a particular viewpoint from the multiple viewpoints.

The act 1010 can further involve learning a plurality of convolutional transformation kernels utilizing camera pose information for the plurality of digital images. The act 1010 can then involve generating the plurality of feature representations by generating a plurality of lifted feature representations and applying convolutional transformation kernels, from the plurality of convolutional transformation kernels that correspond to particular digital images, to the lifted feature representations to generate transformed feature representations.

In one or more embodiments, act 1010 can be performed utilizing entire digital images or downsampled entire digital images. In alternative embodiments, act 1010 can be performed utilizing image patches. For example, act 1010 can involve sampling a plurality of 2D digital image patches from each digital image. Act 1010 can also involve generating the feature representations for the multiple viewpoints by lifting features from the 2D digital image patches.

As shown in FIG. 10, the series of acts 1000 include an act 1020 of generating a plurality of aggregated feature representations by concurrently aggregating the plurality of feature representations. In particular, the act 1020 can include generating a plurality of aggregated feature representations by concurrently aggregating feature representations belonging to subsets of viewpoints from the plurality of feature representations. For example, act 1020 can involve generating the plurality of aggregated feature representations by max pooling feature representations belonging to the subsets of viewpoints from the plurality of feature representations. Act 1020 can further involve selecting the subsets of viewpoints by randomly selecting a threshold number of viewpoints from the multiple viewpoints. Additionally, act 1020 can involve generating the plurality of aggregated feature representations by pooling feature representations (or transformed feature representations) belonging to the subsets of viewpoints from the plurality of feature representations (or a plurality of transformed feature representations).

As shown in FIG. 10, the series of acts 1000 include an act 1030 of generating a 3D voxel feature representation by recurrently aggregating the plurality of aggregated feature representations. In particular, the act 1030 can include recurrently aggregating the plurality of aggregated feature representations utilizing a 3D gated recurrent unit (GRU).

The acts 1000 can further involve rendering a 2D view of an object utilizing the 3D voxel feature representation. In particular, the acts 1000 can include rendering, for display, a 2D view depicting the object from a target viewpoint utilizing the 3D voxel feature representation. Furthermore, the acts 1000 can include rendering, for display, a 2D view depicting an object from a particular viewpoint utilizing the 3D voxel feature representation and a convolutional transformation kernel from the target viewpoint. In addition, the acts 1000 can include rendering a 2D view by utilizing a convolutional transformation kernel from the target viewpoint with the 3D voxel feature representation to sample a frustum feature and rendering the 2D view by utilizing a neural renderer on the frustum feature.

Moreover, the acts 1000 can include generating a 2D view from the 3D voxel feature representation by sampling a frustum feature utilizing a 3D voxel feature representation and a convolutional transformation kernel learned from a target viewpoint. Furthermore, the acts 1000 can include determining a lower-dimension frustum feature from a frustum feature by reducing a dimensionality of the frustum feature. In addition, acts 1000 can include sampling a set of frustum feature patches from a lower-dimension frustum feature. Furthermore, the acts 1000 can include rendering a 2D digital image from the target viewpoint utilizing a neural renderer on the set of frustum feature patches.

In addition, the acts 1000 can include generating a transformed voxel feature by applying a convolutional transformation kernel from the target viewpoint on the 3D voxel feature representation. Moreover, the acts 1000 can include sampling a frustum feature from a transformed voxel feature. In addition, the acts 1000 can include reducing a dimensionality of a frustum feature by utilizing average feature pooling on a depth dimension of the frustum feature. Additionally, the acts 1000 can include sampling a set of frustum feature patches from a lower-dimension frustum feature utilizing stochastic sampling. Moreover, the acts 1000 can include rendering a 2D digital image for a 2D view by utilizing a neural renderer to render individual image patches from a set of frustum feature patches and blending the individual image patches while using overlaps corresponding to the individual image patches.

FIG. 11 illustrates a flowchart of a series of acts 1100 for rendering a novel-view from a plurality of digital images in accordance with one or more embodiments. While FIG. 11 illustrates acts according to one embodiment, alternative embodiments may omit, add to, reorder, and/or modify any of the acts shown in FIG. 11. As shown in FIG. 11, the series of acts 1100 include an act 1110 of generating lifted feature representations of an object for multiple viewpoints. More particularly, act 1110 can involve generating the lifted feature representations of the object from a plurality of two-dimensional (2D) digital images depicting the object from multiple viewpoints. Each of the lifted feature representations correspond to a particular viewpoint from the multiple viewpoints. More particular, act 1110 can involve extracting feature maps from the 2D digital images utilizing a 2D U-Net. Act 1110 can also involve lifting features from the feature maps utilizing the camera pose information for the 2D digital images. Still further, act 1110 can involve generating the lifted feature representations by sampling a plurality of 2D digital image patches from the 2D digital images; extracting feature maps from the plurality of 2D digital image patches; and lifting features from the feature maps. Additionally, the act 1110 can include sampling a plurality of 2D digital image patches utilizing stochastic sampling to select a subset of patches from a set of 2D digital image patches.

As shown in FIG. 11, the series of acts 1100 include an act 1120 of learning convolutional transformation kernels for the multiple viewpoints. In particular, the act 1120 can include learning the convolutional transformation kernel for the viewpoints utilizing camera pose information from the 2D digital images. For example, act 1120 can involve learning the convolutional transformation kernel for a particular viewpoint by applying one or more 3D convolutional layers to the camera pose information for the 2D digital image corresponding to the particular viewpoint.

As shown in FIG. 11, the series of acts 1100 include an act 1130 of generating transformed feature representations by applying the convolutional transformation kernels to the lifted feature representations. In particular, the act 1130 can include performing a 3D convolution operation between the convolutional transformation kernels and the lifted feature representations. In other words, act 1130 can involve performing a 3D convolution operation between a respective convolutional transformation kernel and lifted feature representation pair.

As shown in FIG. 11, the series of acts 1100 include an act 1140 of generating a 3D voxel feature representation utilizing the transformed feature representations. Moreover, the act 1140 can include concurrently and recurrently aggregating the transformed feature representations. For example, act 1140 can involve generating a plurality of aggregated feature representations by pooling transformed feature representations belonging to subsets of viewpoints. Act 1140 can include selecting subsets of viewpoints by randomly selecting a threshold number of viewpoints from the multiple viewpoints. Furthermore, the act 1140 can include generating the plurality of aggregated feature representations utilizing max pooling on the lifted feature representations belonging to the subsets of viewpoints. Additionally, the act 1140 can include fusing the plurality of aggregated feature representations utilizing a 3D gated recurrent unit (GRU).

As shown in FIG. 11, the series of acts 1100 include an act 1150 of rendering a 2D view depicting the object from a target viewpoint utilizing the 3D voxel feature representation. In particular, the act 1150 can include rendering, for display, a 2D view depicting the object from the target viewpoint utilizing the 3D voxel feature representation and a convolutional transformation kernel for the target viewpoint. In addition, the act 1150 can include rendering the 2D view by utilizing the convolutional transformation kernel from the target viewpoint with the 3D voxel feature representation to sample a frustum feature and rendering the 2D view utilizing a neural renderer on the frustum feature. Furthermore, the act 1150 can include determining a lower-dimension frustum feature from a frustum feature by reducing a dimensionality of the frustum feature. In addition, the act 1150 can include sampling a set of frustum feature patches from a lower-dimension frustum feature. Furthermore, the act 1150 can include rendering a 2D digital image utilizing a neural renderer on a set of frustum feature patches.

As mentioned above, FIG. 12 illustrates a flowchart of a series of acts 1200 for rendering a novel-view from a plurality of digital images in accordance with one or more embodiments. While FIG. 12 illustrates acts according to one embodiment, alternative embodiments may omit, add to, reorder, and/or modify any of the acts shown in FIG. 12. As shown in FIG. 12, the series of acts 1200 include an act 1210 of generating a 2D view from a 3D voxel feature representation of an object to depict the object from a target viewpoint. In particular, act 1210 can involve a series of sub-acts.

In particular, the act 1212 can include sampling a frustum feature utilizing the 3D voxel feature representation and a convolutional transformation kernel learned for the target viewpoint. Act 1214 can include determining a lower-dimension frustum feature from the frustum feature by reducing the dimensionality of the frustum feature. Act 1216 can involve sampling a set of frustum feature patches from the lower-dimension frustum feature. Act 1218 can involve applying a neural renderer to the set of frustum feature patches.

The series of acts 1200 can further include generating a transformed voxel feature by applying the convolutional transformation kernel from the target viewpoint on the 3D voxel feature representation. Moreover, the series of acts 1200 can include sampling a frustum feature from a transformed voxel feature. In addition, the series of acts 1200 can include reducing a dimensionality of a frustum feature by utilizing average feature pooling on a depth dimension of the frustum feature. Additionally, the series of acts 1200 can include sampling a set of frustum feature patches from a lower-dimension frustum feature utilizing stochastic sampling. Moreover, the series of acts 1200 can include rendering the 2D digital image utilizing a neural renderer to render individual image patches from the set of frustum feature patches and blending the individual image patches while using overlaps corresponding to the individual image patches.

Optionally, the series of acts 1200 includes generating the 3D voxel feature representation. In such implementations, the series of acts 1200 can involve sampling a plurality of two-dimensional (2D) digital image patches from a plurality of 2D digital images depicting the object from multiple viewpoints. The series of acts 1200 can also involve generating feature representations for the multiple viewpoints by extracting features from the 2D digital image patches. The series of acts 1200 can further include aggregating the feature representations generated from the plurality of 2D digital image patches.

The series of acts 1200 can also involve learning convolutional transformation kernels utilizing camera pose information for each of the multiple viewpoints. The series of acts 1200 can then involve generating transformed feature representations by applying the convolutional transformation kernels to the feature representations by viewpoint. The series of acts 1200 can also involve generating the 3D voxel feature representation utilizing the transformed feature representations. More specifically, the series of acts 1200 can involve generating the 3D voxel feature representation utilizing the transformed feature representations by generating a plurality of aggregated feature representations by concurrently aggregating transformed feature representations belonging to subsets of viewpoints from the plurality of transformed feature representations. The series of acts 1200 can then involve recurrently aggregating the plurality of aggregated feature representations utilizing a gated recurrent unit (GRU).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
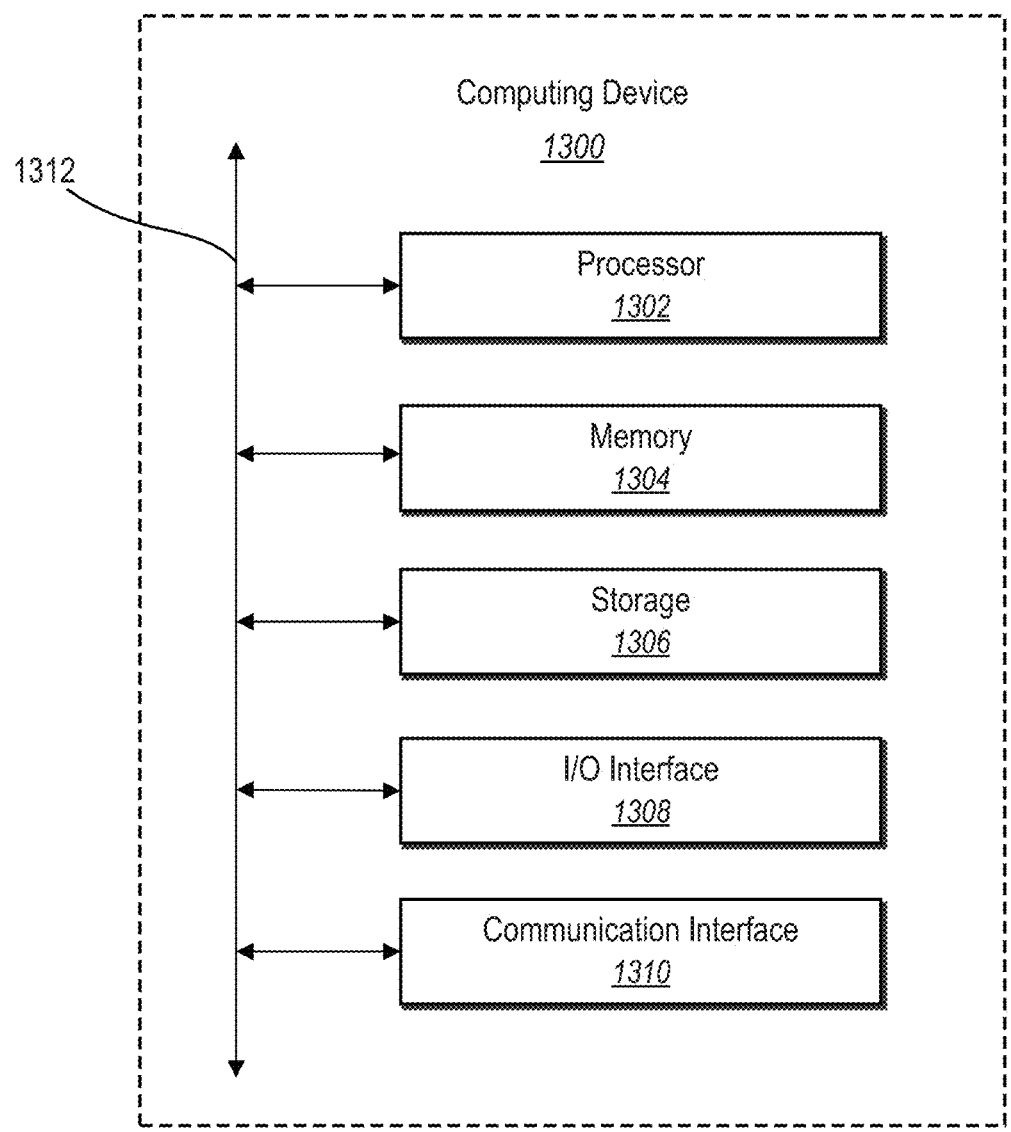
FIG. 13 illustrates a block diagram of an example computing device in accordance with one or more embodiments.

FIG. 13 illustrates a block diagram of an example computing device 1300 that may be configured to perform one or more of the processes described above. One will appreciate that one or more computing devices, such as the computing device 1300 may represent the computing devices described above (e.g., computing device 900, server device(s) 102 and client devices 130a-130n). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive ("HDD"), flash memory, a Universal Serial Bus ("USB") drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller ("NIC") or network adapter for communicating with an Ethernet or other wire-based network or a wireless NIC ("WNIC") or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause the at least one processor to perform operations comprising:
    generating lifted feature representations of an object from a plurality of two-dimensional (2D) digital images depicting the object from multiple viewpoints, each of the lifted feature representations corresponding to a particular viewpoint from the multiple viewpoints;

learning convolutional transformation kernels for the multiple viewpoints utilizing camera pose information from the plurality of 2D digital images;

generating transformed feature representations by applying the convolutional transformation kernels to the lifted feature representations;

generating, based on the plurality of 2D digital images depicting the object from the multiple viewpoints, a three-dimensional (3D) voxel feature representation for the object utilizing the transformed feature representations; and rendering, for display, a 2D view depicting the object from a target viewpoint utilizing the 3D voxel feature representation and a convolutional transformation kernel for the target viewpoint.

2. The non-transitory computer-readable medium of claim 1, wherein learning the convolutional transformation kernels comprises applying one or more 3D convolutional layers on the camera pose information for a given 2D digital image.

3. The non-transitory computer-readable medium of claim 1, wherein generating the lifted feature representations comprises:
extracting feature maps from the plurality of 2D digital images utilizing a 2D U-Net; and
lifting features from the feature maps utilizing the camera pose information for the plurality of 2D digital images.

4. The non-transitory computer-readable medium of claim 1, wherein generating the transformed feature representations comprises performing a 3D convolution operation between a respective convolutional transformation kernel and lifted feature representation pair.

5. The non-transitory computer-readable medium of claim 1, wherein rendering the 2D view comprises:
utilizing the convolutional transformation kernel from the target viewpoint with the 3D voxel feature representation to sample a frustum feature; and
rendering the 2D view by utilizing a neural renderer on the frustum feature.

6. The non-transitory computer-readable medium of claim 1, wherein generating the lifted feature representations comprises:
sampling a plurality of 2D digital image patches from the plurality of 2D digital images;
extracting feature maps from the plurality of 2D digital image patches; and
lifting features from the feature maps.

7. The non-transitory computer-readable medium of claim 1, wherein generating the 3D voxel feature representation comprises recurrently and concurrently aggregating the transformed feature representations.

8. A computer-implemented method comprising:
generating lifted feature representations of an object from a plurality of two-dimensional (2D) digital images depicting the object from multiple viewpoints, the lifted feature representations corresponding to particular viewpoints from the multiple viewpoints;
learning convolutional transformation kernels for the multiple viewpoints utilizing camera pose information from the plurality of 2D digital images;
generating transformed feature representations by applying the convolutional transformation kernels to the lifted feature representations;
generating, based on the plurality of 2D images depicting the object from the multiple viewpoints, a three-dimensional (3D) voxel feature representation for the object utilizing the transformed feature representations; and rendering, for display, a 2D view depicting the object from a target viewpoint utilizing the 3D voxel feature representation and a convolutional transformation kernel for the target viewpoint.

9. The computer-implemented method of claim 8, wherein generating the plurality of lifted feature representations comprises:
extracting feature maps from the plurality of 2D digital images; and
lifting features from the feature maps.

10. The computer-implemented method of claim 8, wherein learning the convolutional transformation kernels comprises applying one or more 3D convolutional layers on the camera pose information for a given 2D digital image.

11. The computer-implemented method of claim 8, wherein generating the 3D voxel feature representation comprises aggregating the transformed feature representations.

12. The computer-implemented method of claim 11, wherein aggregating the transformed feature representations comprises pooling transformed feature representations.

13. The computer-implemented method of claim 11, wherein aggregating the transformed feature representations comprises recurrently aggregating the transformed feature representations utilizing a gated recurrent unit.

14. The computer-implemented method of claim 8, further comprising:
receiving a user selection of the target viewpoint; and
generate the 2D view from the 3D voxel feature representation of the object to depict the object from the target viewpoint utilizing a sampled frustum feature and the convolutional transformation kernel for the target viewpoint.

15. The computer-implemented method of claim 8, wherein generating the transformed feature representations comprises performing a 3D convolution operation between a respective convolutional transformation kernel and lifted feature representation pair.

16. A system comprising:
one or more memory devices comprising a plurality of digital images depicting an object from multiple viewpoints; and
one or more processor devices configured to cause the system to:
generate lifted feature representations of an object from a plurality of two-dimensional (2D) digital images depicting the object from multiple viewpoints, each of the lifted feature representations corresponding to a particular viewpoint from the multiple viewpoints;
learn convolutional transformation kernels for the multiple viewpoints utilizing camera pose information from the plurality of 2D digital images;
generate transformed feature representations by applying the convolutional transformation kernels to the lifted feature representations;
generate, based on the plurality of 2D digital images depicting the object from the multiple viewpoints, a three-dimensional (3D) voxel feature representation for the object utilizing the transformed feature representations; and
render, for display, a 2D view depicting the object from a target viewpoint utilizing the 3D voxel feature representation and a convolutional transformation kernel for the target viewpoint.

17. The system of claim 16, wherein the one or more processor devices are further configured to generate the lifted feature representations by:
- extracting feature maps from the plurality of 2D digital images; and
- lifting features from the feature maps.

18. The system of claim 17, wherein the one or more processor devices are further configured to:
- sample a plurality of digital image patches from the plurality of 2D digital images; and
- extract the feature maps from the plurality of digital image patches.

19. The system of claim 16, wherein the one or more processor devices are configured to render the 2D view from the 3D voxel feature representation utilizing a sampled frustum feature and the convolutional transformation kernel associated with the target viewpoint.

20. The system of claim 16, wherein the one or more processor devices are configured to learn the convolutional transformation kernels by applying one or more 3D convolutional layers on the camera pose information for a given 2D digital image.

\* \* \* \* \*